United States Patent
Koyle et al.

(10) Patent No.: US 10,883,234 B2
(45) Date of Patent: *Jan. 5, 2021

(54) TRAFFIC WARNING SYSTEMS, METHODS, AND DEVICES

(71) Applicant: IZONUS, LLC, Kaysville, UT (US)

(72) Inventors: Roger D. Koyle, Kaysville, UT (US); Jed C. Davis, Fruit Heights, UT (US); Bradley K. Andrews, Kaysville, UT (US)

(73) Assignee: IZONUS, LLC, Kaysville, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/700,953

(22) Filed: Dec. 2, 2019

(65) Prior Publication Data

US 2020/0102710 A1    Apr. 2, 2020

Related U.S. Application Data

(63) Continuation of application No. 16/151,151, filed on Oct. 3, 2018, now Pat. No. 10,494,780.

(Continued)

(51) Int. Cl.
| | | |
|---|---|---|
| *G08G 1/095* | (2006.01) | |
| *E01F 9/608* | (2016.01) | |
| *E01F 9/615* | (2016.01) | |
| *E01F 9/654* | (2016.01) | |
| *H02J 7/00* | (2006.01) | |

(Continued)

(52) U.S. Cl.
CPC .............. *E01F 9/608* (2016.02); *E01F 9/615* (2016.02); *E01F 9/654* (2016.02); *E01F 9/688* (2016.02); *F21S 9/02* (2013.01); *F21S 9/022* (2013.01); *G08G 1/09* (2013.01); *G08G 1/0955* (2013.01);

(Continued)

(58) Field of Classification Search
CPC . E01F 9/608; E01F 9/654; E01F 9/615; E01F 9/688; F21S 9/022; F21S 9/02; G08G 1/09; G08G 1/0955; H02J 7/0044; F21W 2111/02; H05B 37/0218; Y02B 20/46; Y02B 20/48
USPC ..... 340/908, 908.1, 522, 907; 362/183, 191, 362/249.02, 253
See application file for complete search history.

(56) References Cited

U.S. PATENT DOCUMENTS 5,294,924 A     3/1994  Dydzyk
5,578,854 A *  11/1996  Chen ..................... H01L 23/485
                                                                 257/347

(Continued)

FOREIGN PATENT DOCUMENTS

JP         2011089309 A       5/2011

OTHER PUBLICATIONS

U.S. Appl. No. 16/151,151, filed Oct. 3, 2018.

*Primary Examiner* — Anh V La
(74) *Attorney, Agent, or Firm* — Maschoff Brennan

(57) ABSTRACT

A lighting device may include a body including a front cavity and a back cavity, and a bottom face between the front cavity and the back cavity. The lighting device may also include multiple lights, with at least one of the lights disposed within the front cavity, and at least one of the lights disposed within the back cavity. The lighting device may additionally include a coupling device, such as a female threaded component, configured to interface directly with an attachment mechanism atop a traffic cone. The coupling device may be disposed on the bottom face of the body.

15 Claims, 30 Drawing Sheets

Related U.S. Application Data

(60) Provisional application No. 62/693,297, filed on Jul. 2, 2018, provisional application No. 62/568,095, filed on Oct. 4, 2017.

(51) Int. Cl.
```
G08G 1/09      (2006.01)
F21S 9/02      (2006.01)
E01F 9/688     (2016.01)
G08G 1/0955    (2006.01)
F21W 111/02    (2006.01)
```

(52) U.S. Cl.
CPC ........ *H02J 7/0044* (2013.01); *F21W 2111/02* (2013.01)

(56) References Cited

U.S. PATENT DOCUMENTS

| | | | |
|---|---|---|---|
| 5,755,174 A * | 5/1998 | Freeman | B60Q 7/00 116/63 C |
| 7,997,764 B1 | 8/2011 | Nielson | |
| 8,602,584 B2 | 12/2013 | Ghafoori et al. | |
| 10,494,780 B2 * | 12/2019 | Koyle | E01F 9/615 |
| 2008/0011221 A1 | 1/2008 | Dvoracek | |
| 2008/0038057 A1 | 2/2008 | Stadler | |
| 2009/0195412 A1 | 8/2009 | Chen | |
| 2010/0176762 A1 | 7/2010 | Daymude et al. | |
| 2014/0074696 A1 | 3/2014 | Glaser | |
| 2014/0197955 A1 | 7/2014 | Martin et al. | |
| 2015/0085184 A1 | 3/2015 | Vidal et al. | |

\* cited by examiner

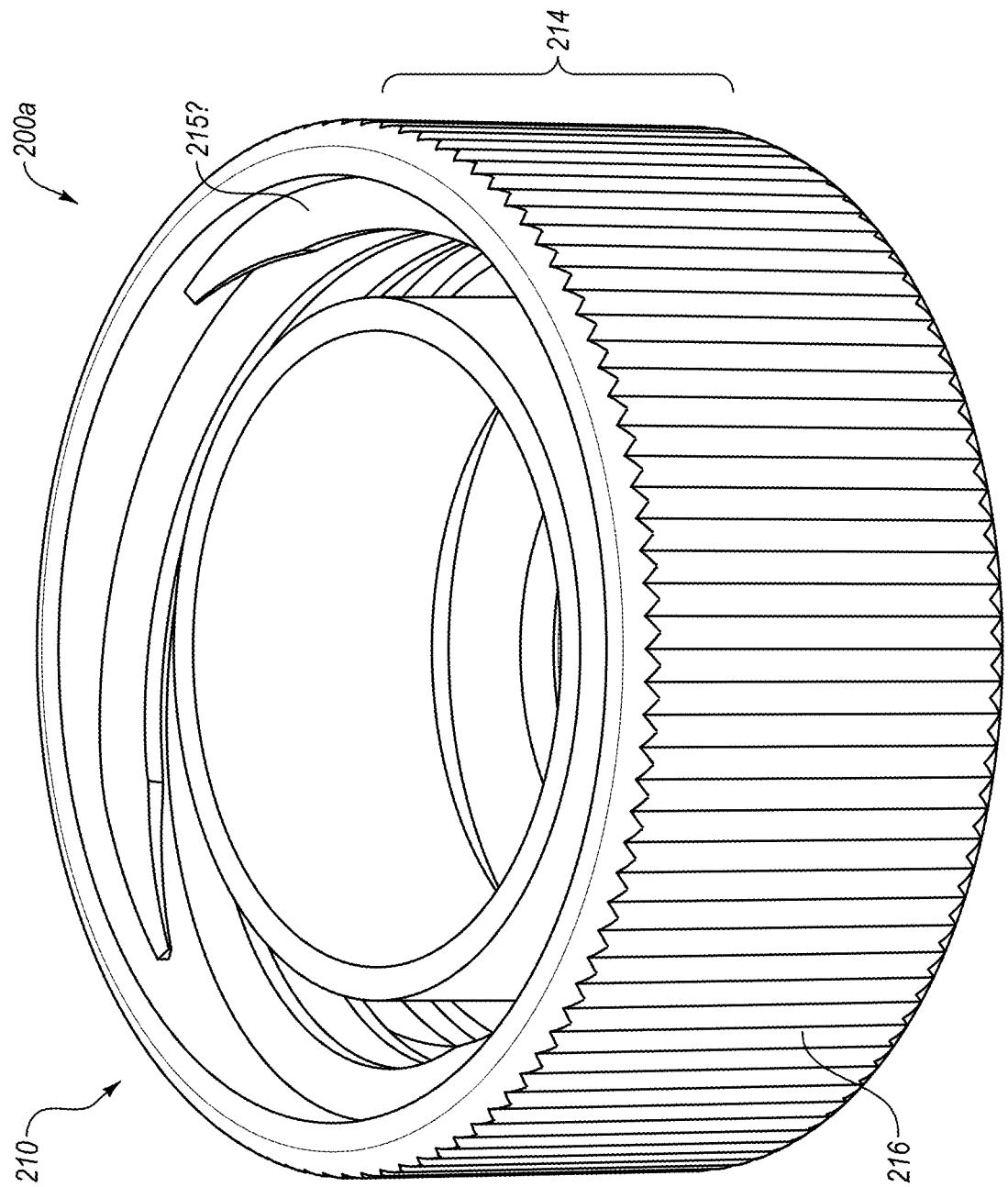

TRAFFIC WARNING SYSTEMS, METHODS, AND DEVICES

This application is a continuation of U.S. patent application Ser. No. 16/151,151, filed on Oct. 3, 2018, entitled IMPROVED TRAFFIC WARNING SYSTEMS, METHODS, AND DEVICES which claims priority to and the benefit of U.S. Provisional Patent Application No. 62/568,095, filed Oct. 4, 2017, entitled TRAFFIC WARNING SYSTEMS, METHODS, AND DEVICES and U.S. Provisional Application No. 62/693,297, filed Jul. 2, 2018, entitled CONE TOP, all of which are incorporated herein in their entireties.

FIELD

The present disclosure relates to improved traffic warning systems, methods, and devices.

BACKGROUND

For the past 100 years, Police, Emergency Services, and Traffic Control have been relying on flammable warning torches that look very much like sticks of dynamite. Police officers and other related services personnel are burning holes in their uniforms on a regular basis. That method is very inefficient, expensive, environmentally unfriendly, time consuming, and dangerous.

The subject matter claimed herein is not limited to embodiments that solve any disadvantages or that operate only in environments such as those described above. Rather, this section is only provided to illustrate one exemplary technology area where some embodiments described herein may be practiced.

SUMMARY

One or more embodiments of the present disclosure may include a lighting device with a body including a front cavity and a back cavity, and a bottom face between the front cavity and the back cavity. The lighting device may also include multiple lights, with at least one of the lights disposed within the front cavity, and at least one of the lights disposed within the back cavity. The lighting device may additionally include a coupling device, such as a female threaded component, configured to interface directly with an attachment mechanism atop a traffic cone. The coupling device may be disposed on the bottom face of the body.

It is to be understood that both the foregoing general description and the following detailed description are merely examples and explanatory and are not restrictive of the invention, as claimed.

Additional features and advantages of the disclosure will be set forth in the description which follows, and in part will be apparent from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth hereinafter.

BRIEF DESCRIPTION OF THE DRAWINGS

To further clarify the above and other advantages and features of the present disclosure, a more particular description of the disclosure will be rendered by reference to specific embodiments thereof which are illustrated in the appended drawings. It is appreciated that these drawings depict only some embodiments of the disclosure and are therefore not to be considered limiting of its scope. The disclosure will be described and explained with additional specificity and detail through the use of the accompanying drawings in which:

FIGS. 2A and 2B illustrate an example cone cap;

DETAILED DESCRIPTION

Embodiments of the present disclosure relate to devices, methods, and/or systems utilized in providing traffic warning systems utilizing lighting devices. Such devices may be used by police, emergency services, construction workers, traffic control, private individuals, or any other entity to facilitate information, safety, and/or guidance to others. For example, the lighting devices consistent with the present disclosure may be placed in closed traffic lanes, for emergency roadside situations, for traffic direction, etc. Devices and/or systems or methods of the present disclosure may be designed to accommodate the need for police, emergency services, and/or traffic control personnel, in the event of an accident, to quickly deploy an effective, efficient traffic control safety zone for the victims, the public and themselves.

Embodiments of the present disclosure are explained with reference to the accompanying drawings.

Figure 1A:
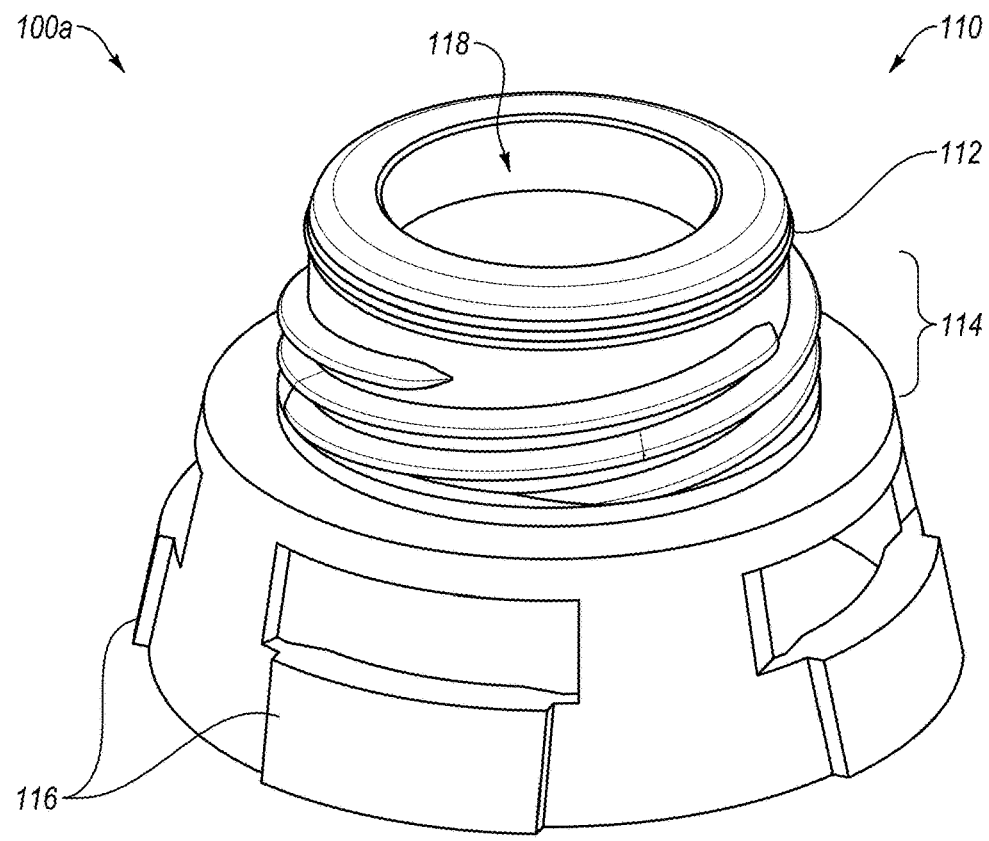
FIGS. 1A, 1B, and 1C illustrate various views of an example traffic warning system, including a traffic cone and a cone attachment member.
Figure 1A:
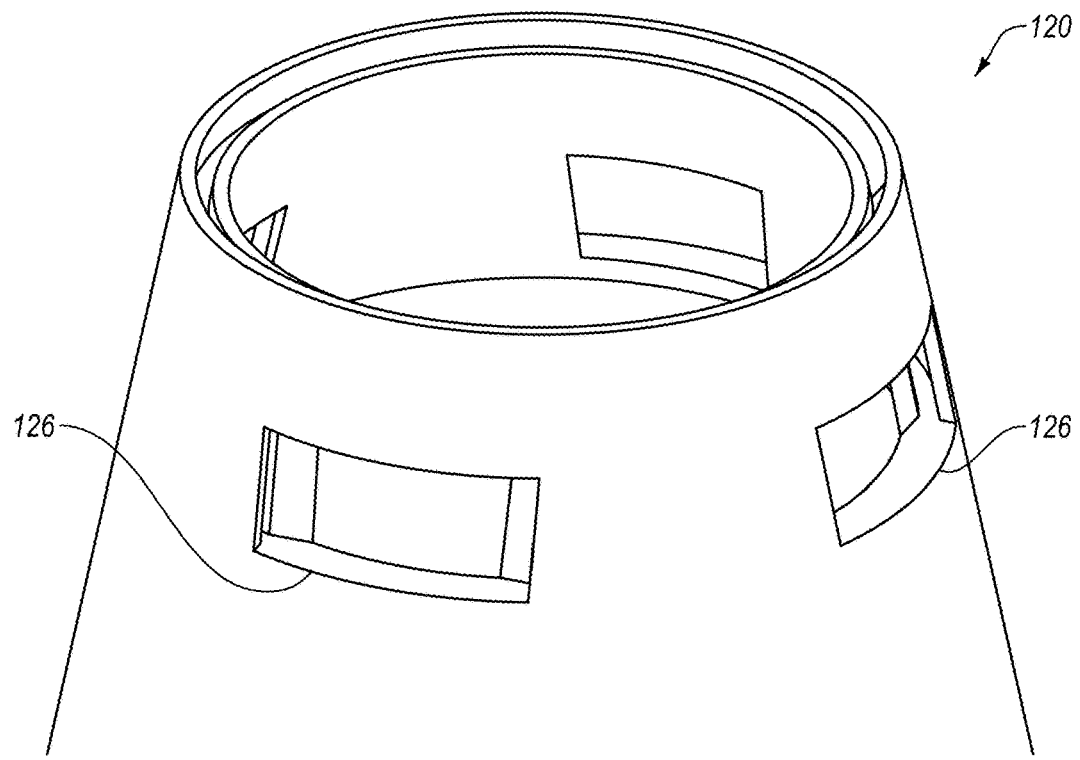
Figure 1B:
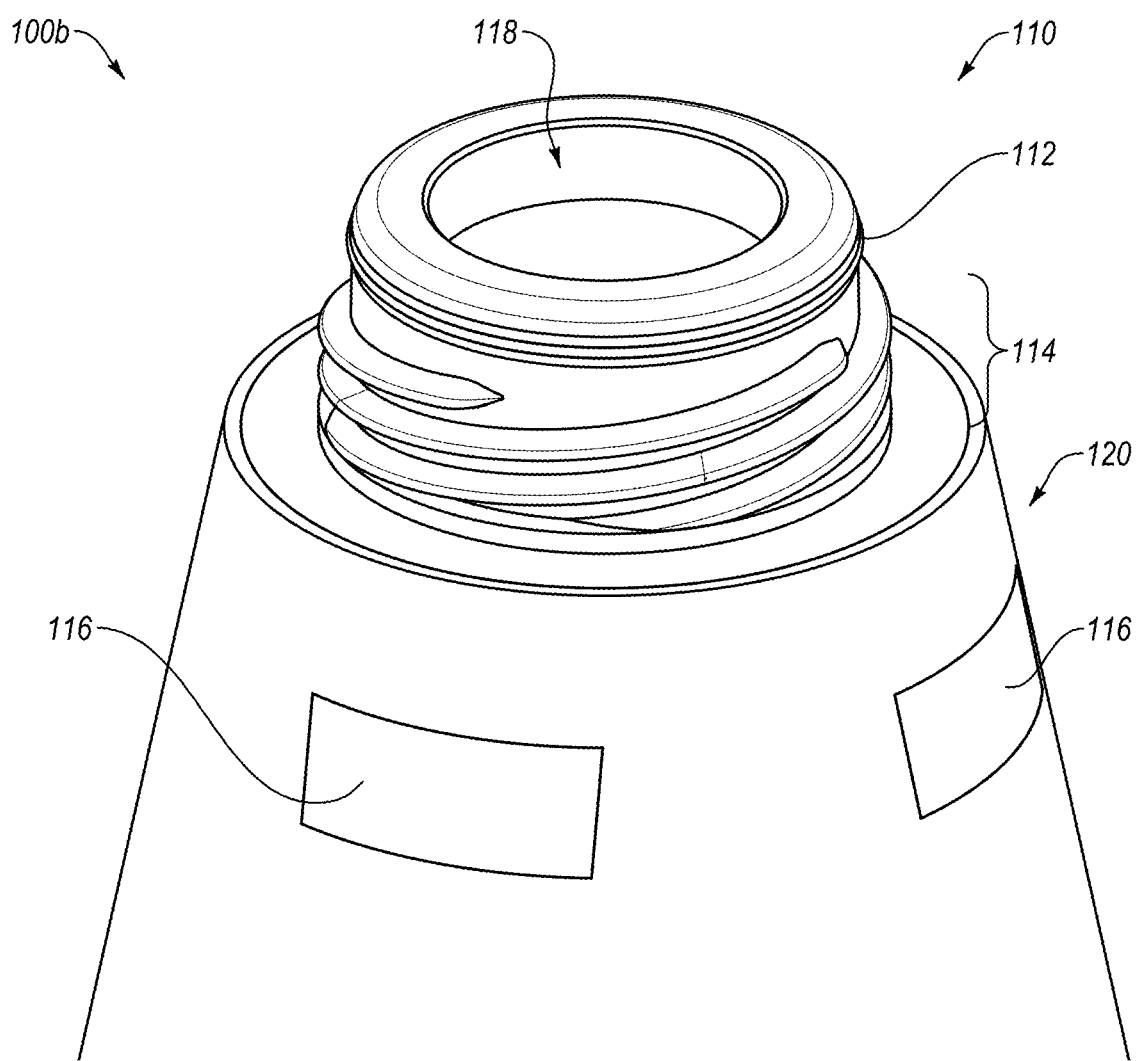
Figure 1C:
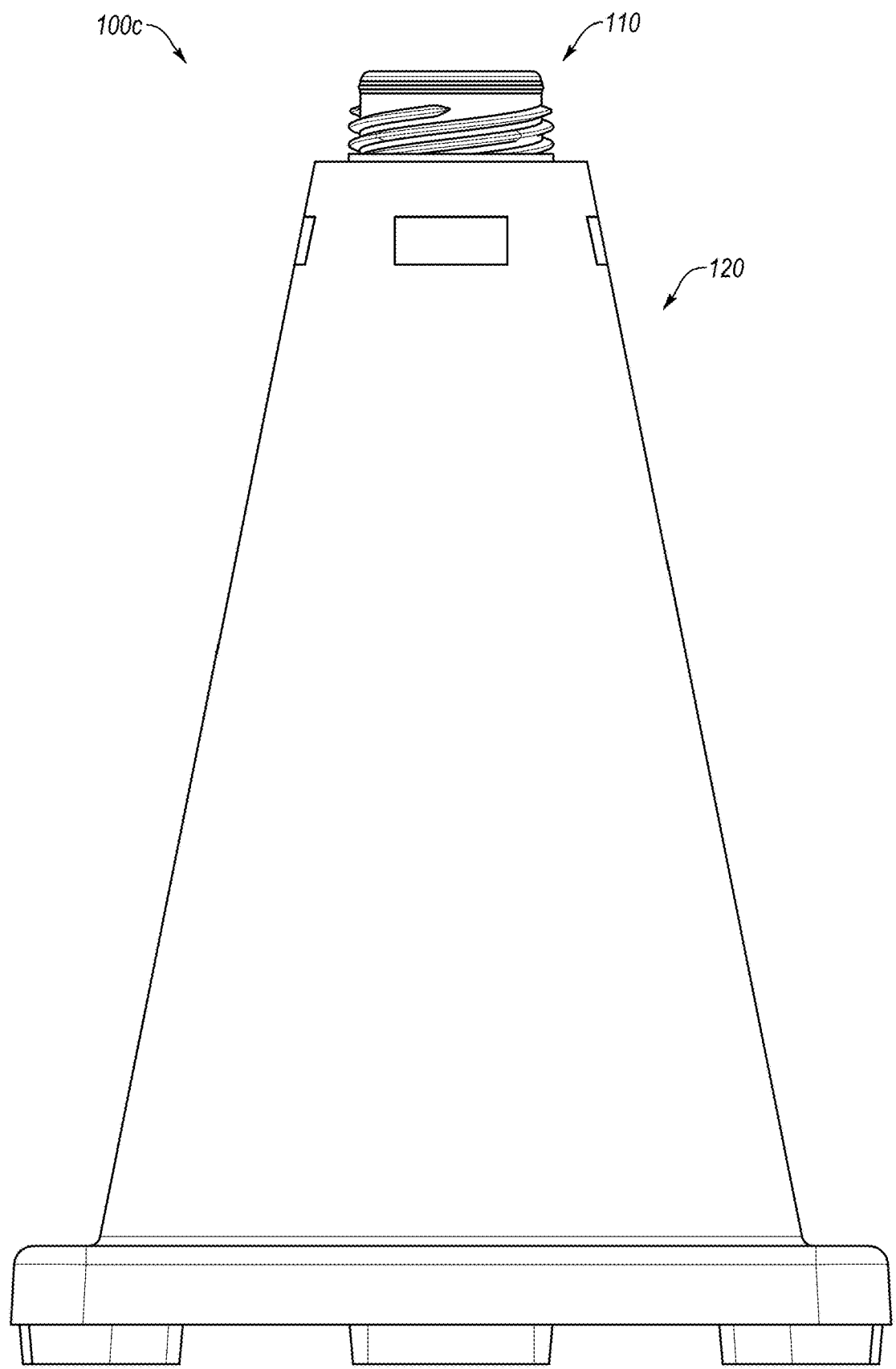

FIGS. 1A, 1B, and 1C illustrate various views of an example traffic warning system 100 (the views of the system 100 distinguishable as the system 100a, 100b, and 100c), including a traffic cone 120 and a cone attachment member 110, in accordance with one or more embodiments of the present disclosure. The cone attachment member 110 may be disposed atop the traffic cone 120. FIG. 1A illustrates an exploded view of the traffic cone 120 and the cone attachment member 110. FIG. 1B illustrates a perspective view of the traffic cone 120 and the cone attachment member 110 fixedly coupled to each other. FIG. 1C illustrates a side view of the entire traffic cone 120 with the cone attachment member 110 fixedly coupled thereto.

As illustrated in FIG. 1A, the cone attachment member 110 may include one or more features acting as an attachment mechanism such that various devices or components may be removably coupled with the traffic cone 120 via the cone attachment member 110. In some embodiments, such as that illustrated in FIGS. 1A-1C, the cone attachment member 110 may include a lip 112 and/or a threaded portion 114 acting as the attachment mechanism. In these and other embodiments, the cone attachment member 110 as illustrated in FIGS. 1A-1C may be referred to as a male connecting member, such as a male threaded member, as the male connecting member may be configured to interface with and received within a corresponding female component (such as a nut (acting as the female component) and a bolt (acting as the male component)).

In some embodiments, by using the threaded portion 114 in conjunction with the lip 112, as the cone attachment member 110 is threaded into a corresponding female threaded member, as the threads progress the interference fit increases to securely attach a component to the cone attachment member 110. As the threaded portions 114 is completely interlocked with a corresponding female component, a lip on the female component and the lip 112 on the cone attachment member 110 may be required to be forced past each other to lock the two components together. In such an embodiment, a more secure connection is established as an increased force must be exerted to decouple the male and female components as compared to threaded male and female components without corresponding lips, including the lip 112.

In some embodiments, the cone attachment member 110 may include one or more flanges 116 to facilitate coupling the cone attachment member 110 with the traffic cone 120. For example, the traffic cone 120 may include one or more openings 126 that may correspond to the flanges 116 of the cone attachment member 110. Additionally or alternatively, the traffic cone 120 may include flanges and the cone attachment member may include corresponding openings.

In some embodiments, the cone attachment member 110 may be fixedly coupled with the traffic cone 120 in any of a variety of ways. For example, the cone attachment member 110 may be formed of a high temperature plastic and the traffic cone 120 may be molded directly to the cone attachment member 110. As another example, the cone attachment member 110 may be placed in direct physical contact with the traffic cone 120 and the traffic cone 120 may be melted, welded, or otherwise physically coupled to the cone attachment member 110. In some embodiments, the effect of such coupling between the cone attachment member 110 and the traffic cone 120 may result in the cone attachment member 110 and the traffic cone 120 becoming a single unitary body.

In some embodiments, the cone attachment member 110 may be coupled to the traffic cone 120 after the traffic cone 120 is completely formed and may already be in use. In these and other embodiments, the cone attachment member 110 may be inserted inside of the traffic cone 120 from the bottom and forced up through a top hole in the traffic cone 120 such that the flanges project into the openings 126. As another example, such as when the traffic cone 120 includes flanges, the cone attachment member 110 may be forced downward on the traffic cone 120 until the flanges from the traffic cone 120 project into the openings of the cone attachment member 110. While various examples have been provided, it is appreciated that any coupling technique may be utilized to combine the cone attachment member 110 with the traffic cone 120 such that a device may be coupled to the traffic cone 120 via the cone attachment member 110.

In some embodiments the cone attachment member 110 may include a top hole 118 that is configured to correspond to a cone hole at the top of the traffic cone 120. In these and other embodiments, the cone attachment member 110 may be shaped to interface with multiple devices, and/or facilitate devices being inserted through the top hole 118 (such as the lighting device illustrated in FIGS. 9A-9E) and thus inside of the traffic cone 120, as well as being coupled to the male component of the attachment mechanism (e.g., the threaded portion 114 and/or the lip 112) via a single component.

Figure 13B:
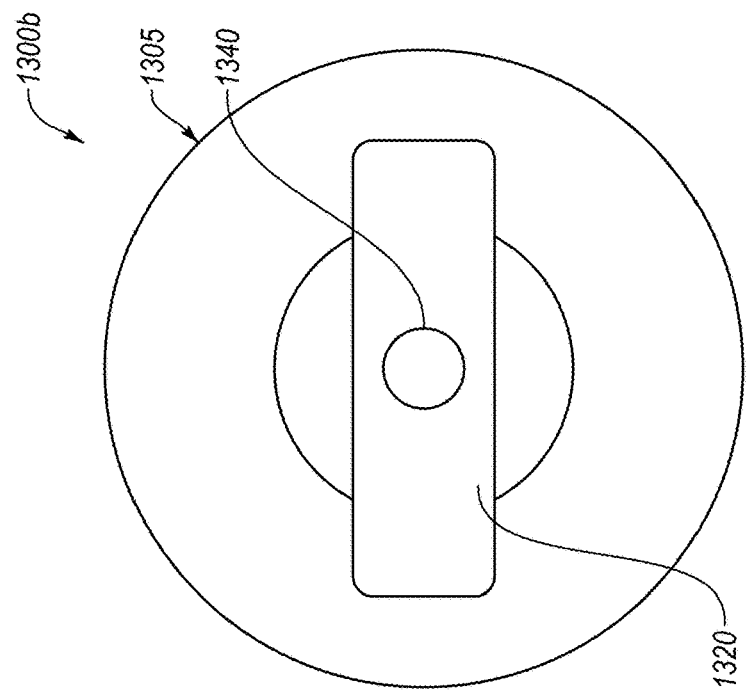
FIG. 13B illustrates an example traffic warning system utilizing the device of FIG. 13A.
Figure 13A:
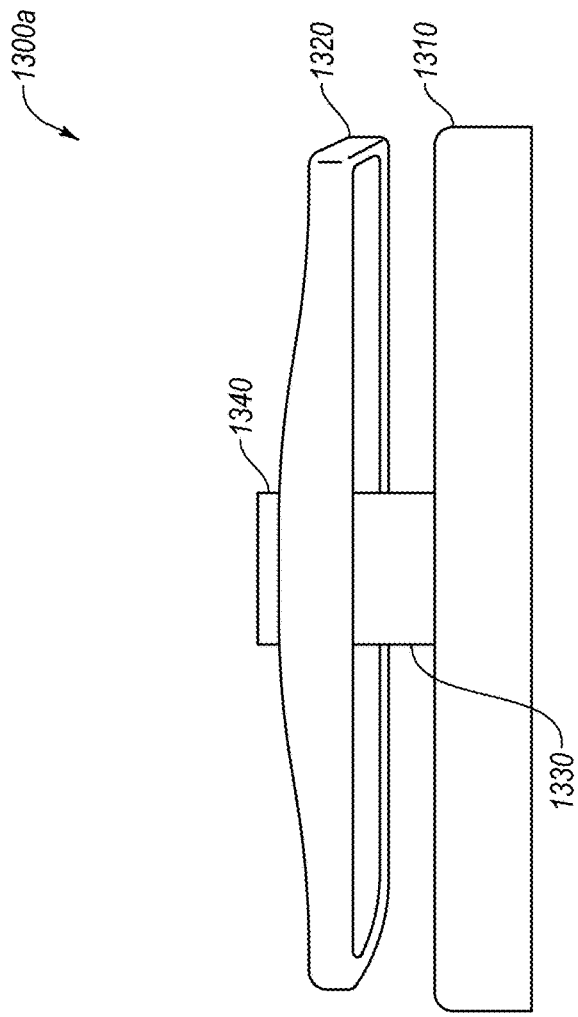
FIG. 13A illustrates a device for coupling with a traffic cone in a traffic warning system.

Modifications, additions, or omissions may be made to the system 100 without departing from the scope of the present disclosure. For example, the system 100 may include more or fewer elements than those illustrated in FIGS. 1A-1C. As another example, any type of attachment mechanism may be used by the cone attachment member 110. An example of an alternative attachment mechanism is illustrated in FIGS. 13A-13B. As another example, while the cone attachment member 110 is illustrated as utilizing a male threaded component, it is readily within the scope of the present disclosure that a female threaded component may be used.

Figure 2A:
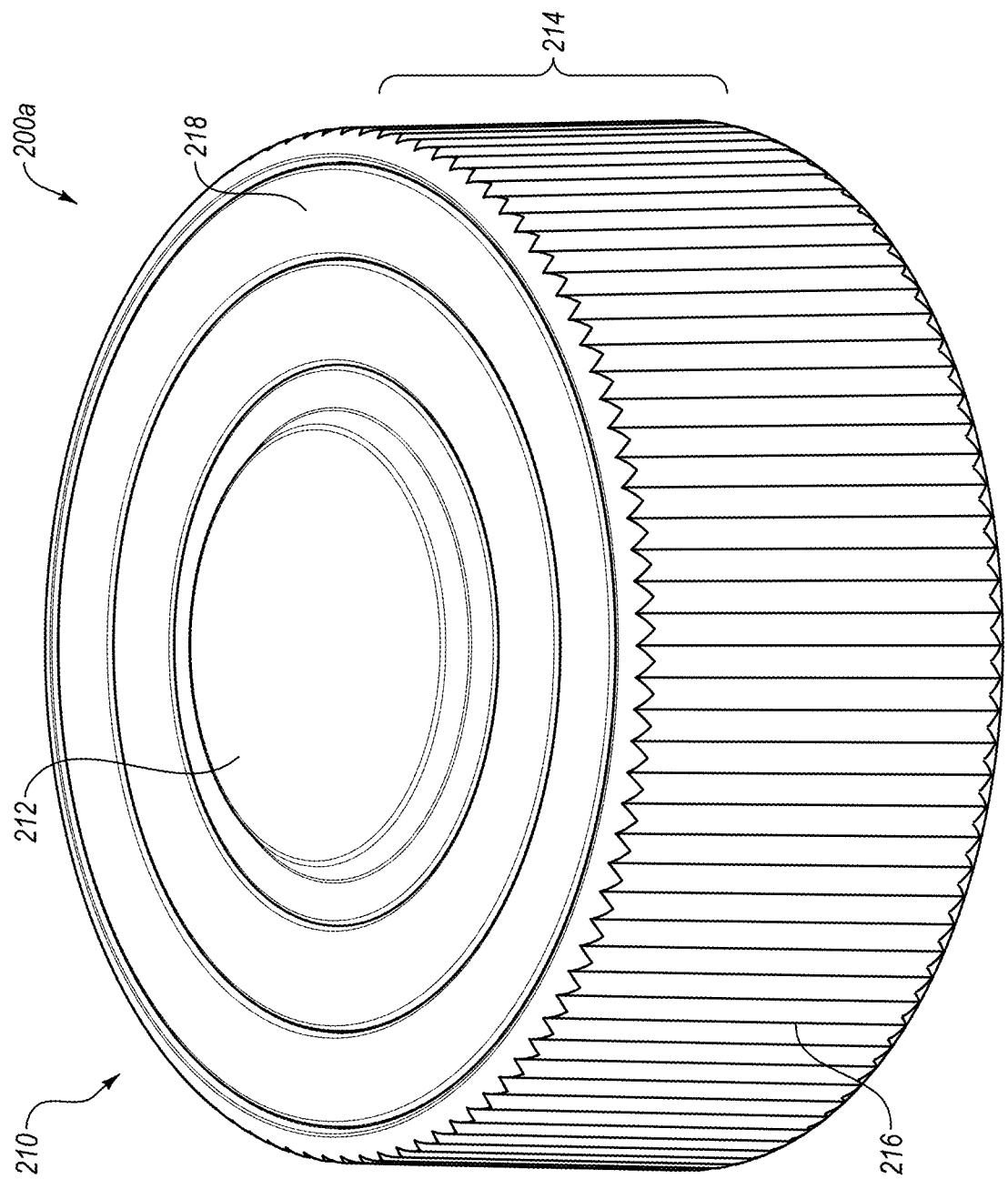

FIGS. 2A and 2B illustrate an example cone cap 210, in accordance with one or more embodiments of the present disclosure. The cone cap 210 may be shaped and/or configured to interface with a cone attachment member, such as the cone attachment member 110 of FIGS. 1A-1C.

As illustrated in FIGS. 2A and 2B, the cone cap 210 may include a metal disk 212 on the top of the cone cap, a threaded portion 214 within the cone cap 210, ridges 216 on the outside of the cone cap 210, and band 218 outside of the metal disk 212 on the top of the cone cap 210.

The metal disk 212 may be made of a metal that is attracted to magnets, such as a ferrous metal, although any other material attracted to magnets may be utilized, such as iron, nickel, cobalt, alloys thereof, lodestone, etc. In these and other embodiments, the metal disk 212 may operate as an attachment mechanism for one or more devices to a cone to which the cone cap 210 is coupled. In some embodiments, the metal disk 212 may itself be magnetized such that any ferromagnetic object may be coupled to the top of a cone via the cone cap 210. While FIGS. 2A and 2B illustrate the metal disk on top of the cone cap 210, it is appreciated that any other device or component to function as an attachment mechanism may be coupled to or formed in the top of the cone cap 210.

In some embodiments, the metal disk 212 may be configured to operate as an electrode to provide power to a device coupled to the cone cap 210. For example, the metal disk 212 may pass completely through the cone cap 210 and be in contact with a power source, such as a battery or wire, of a device or component disposed within the cone cap 210 proximate the threaded portion 214. For example, a lighting device, battery device, or other device may interface with the threaded portion 214 of the cone cap and may have an electrical connector that is to interface with the metal disk 212 when securely coupled to the cone cap 210. In this manner, the lighting device or battery device may provide power to a device coupled to the cone cap 210.

The threaded portion 214 within the cone cap 210 may operate as a female portion of a coupling mechanism. For example, the inner threaded portion 214 of the cone cap 210 may interface directly with the threaded portion 114 of the cone attachment member 110 of FIGS. 1A-1C. In these and other embodiments, the cone cap 210 may include a lip at the end of the threaded portion 214 that may correspond to the lip 112 of the cone attachment member 110 of FIGS. 1A-1C, such that the lip at the end of the threaded portion 214 is to pass the lip 112 when forming a secure coupling between the cone cap 210 and the cone attachment member 110.

In some embodiments, if the cone attachment member 110 utilizes a female threaded component, the cone cap 210 may utilize a male threaded component. For example, the cone cap 210 may function as a threaded plug rather than a cap.

The ridges 216 may facilitate grip for a user when coupling the cone cap 210 to a cone attachment member.

The band 218 may provide a decorative effect, may provide a company name or other identifier, or may provide some other aesthetic benefit. Additionally or alternatively, the band 218 may serve a functional aspect. For example, the band 218 may act as a cushion or padding for a device or component coupled to the cone cap 210 via the metal disk 212. As another example, if the metal disk 212 operates as an electrode, the band 218 may also operate as an insulator or an electrode, and may be made of different and appropriate materials depending on the use. For example, the band 218 may act as an insulator for the metal disk 212. As another example, the body of the cone cap 210 may act as an insulator and the band 218 may act as another electrode, e.g., the metal disk 212 may operate as a positive terminal and the band 218 may act as a negative terminal, or vice versa. In such an embodiment, the band 218 may extend through the entire body or at least portions of the cone cap 210 and be shaped or configured to interface with a device coupled to the cone cap 210 and proximate the threaded portion 214.

In some embodiments, the band 218 may be made of a magnetized material with an opposite polarity from the metal disk 212. For example a device with a magnet with a north pole oriented outwards on the bottom of the device may be guided and centered on the cone cap 210 if the metal disk has a south pole oriented outwards and the band 218 has a north pole oriented outwards, such that the magnet of the device is repelled away from the band 218 while simultaneously being attracted to the metal disk 212.

Modifications, additions, or omissions may be made to the cone cap 210 without departing from the scope of the present disclosure. For example, the cone cap 210 may include more or fewer elements than those illustrated in FIGS. 2A and 2B. As another example, any type of attachment mechanism may be used by the cone cap 210. As an additional example, the cone cap 210 may omit the band 218, the ridges 216, or other components.

Figure 2C:
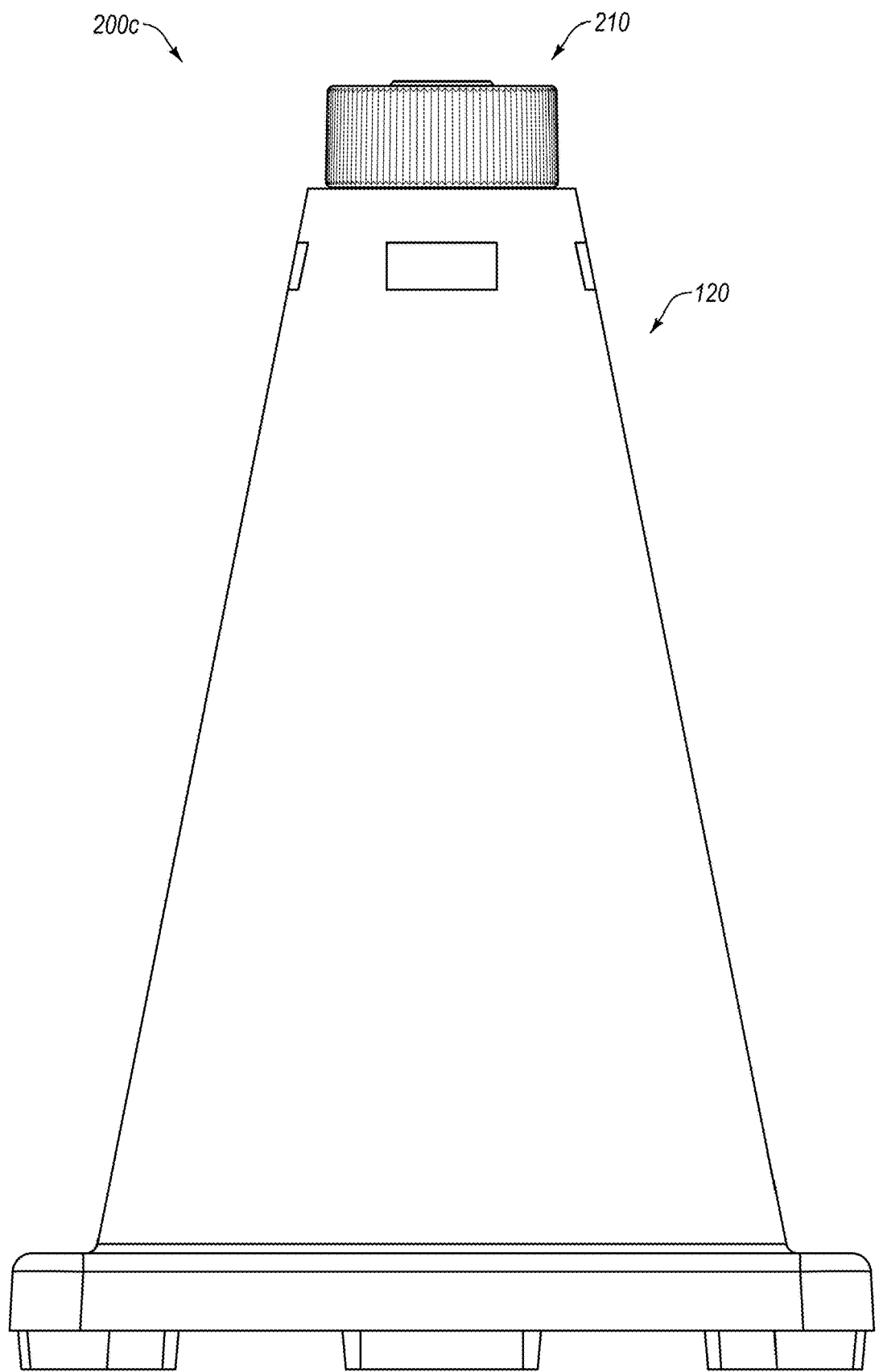
FIG. 2C illustrates another example traffic warning system include the traffic cone cap of FIGS. 2A and 2B.

FIG. 2C illustrates another example traffic warning system 200 that includes the cone cap 210 of FIGS. 2A and 2B, in accordance with one or more embodiments of the present disclosure. As illustrated in FIG. 2C, the cone cap 210 may interface with the cone attachment member 110 (not seen) atop the traffic cone 120. In this way, the hole of the traffic cone 120 may be capped. Additionally, the cone cap 210 may facilitate coupling a device to the traffic cone 120 that utilizes an attachment mechanism consistent with the cone cap 210 but inconsistent with the cone attachment member 110.

Modifications, additions, or omissions may be made to the system 200 without departing from the scope of the present disclosure. For example, the system 200 may include more or fewer elements than those illustrated in FIG. 2C. As another example, the system 200 may include a device coupled to the cone cap 210.

Figure 3A:
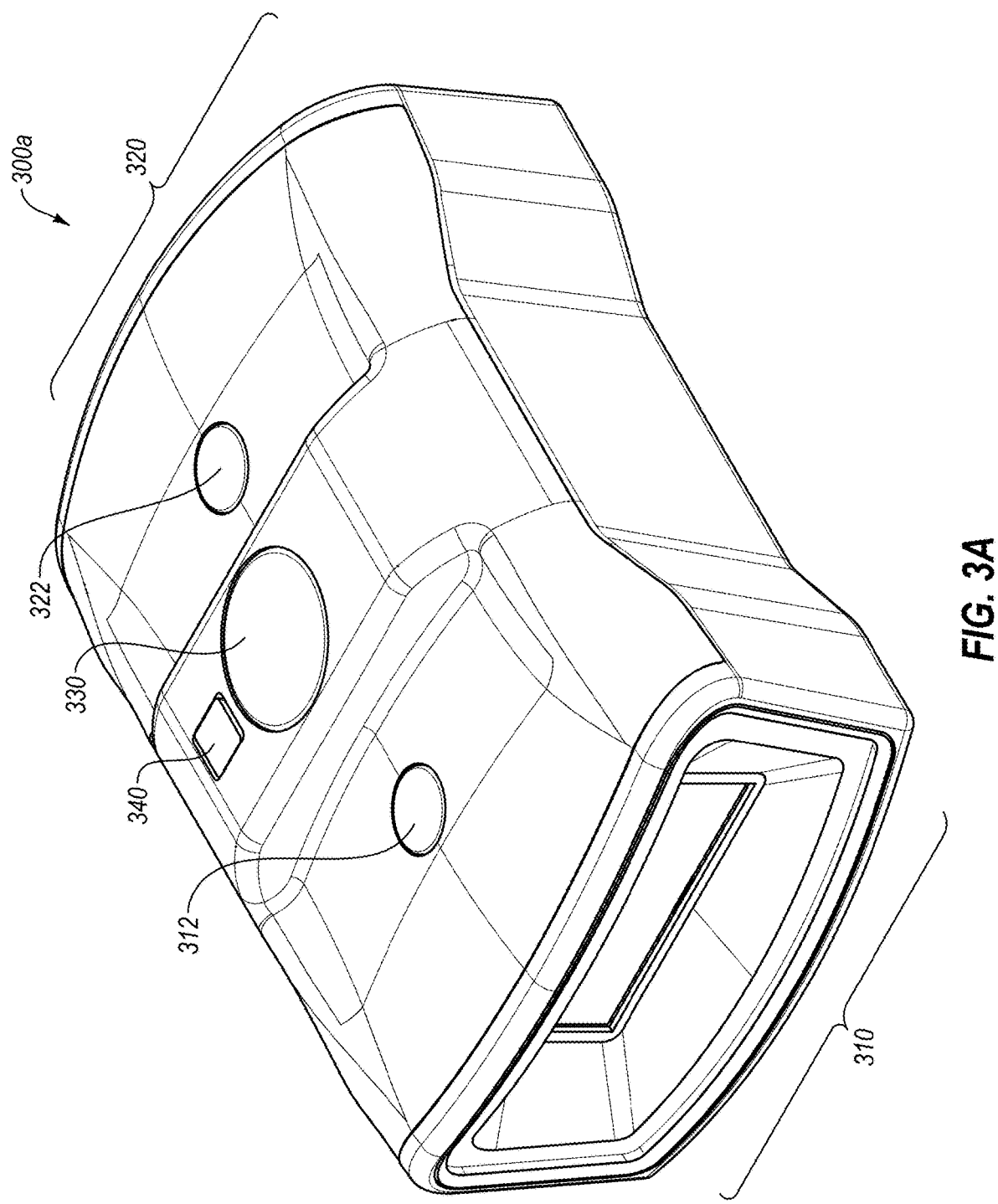
FIGS. 3A and 3B illustrate an example lighting device.
Figure 3B:
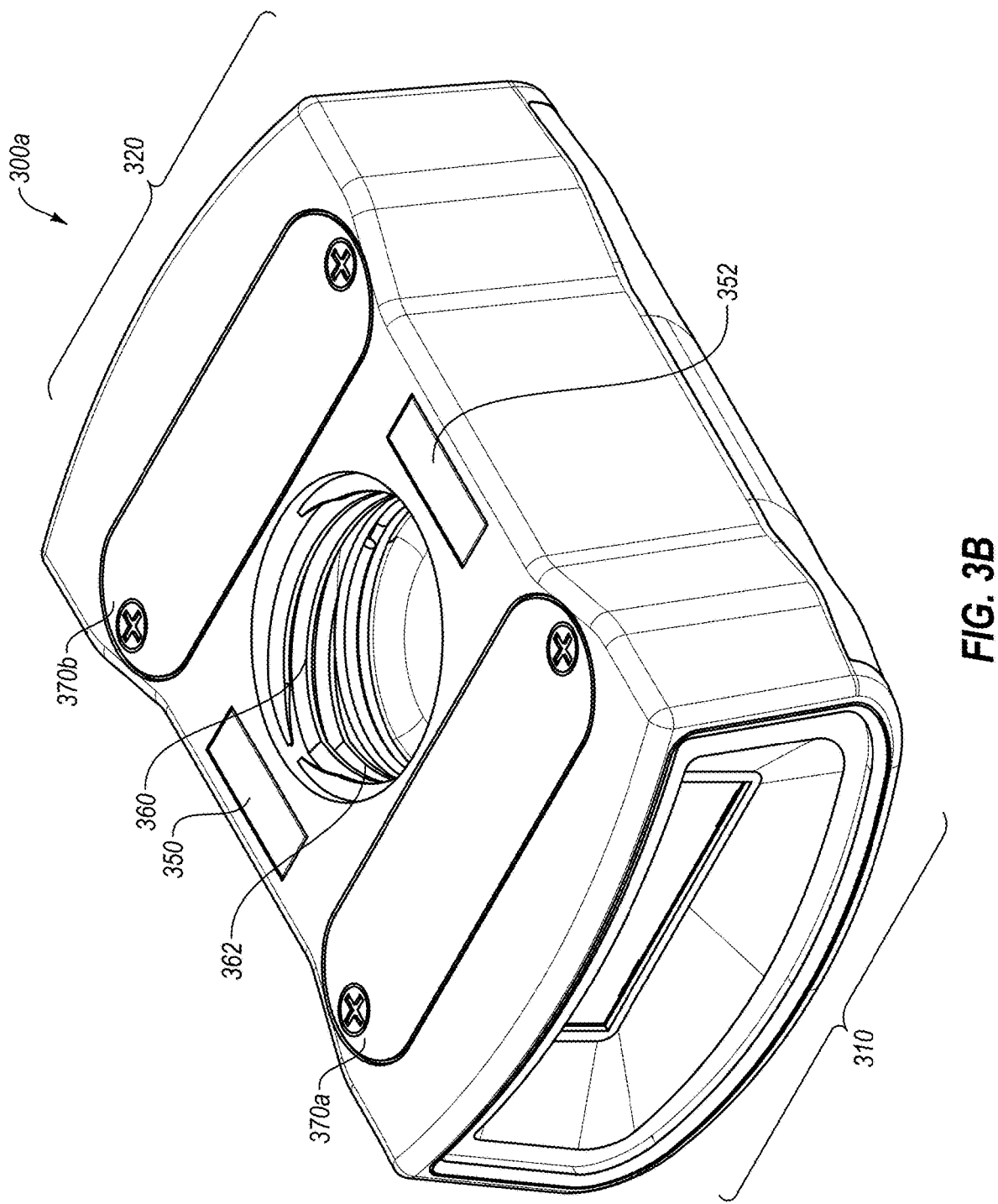

FIGS. 3A and 3B illustrate an example lighting device 300a, in accordance with one or more embodiments of the present disclosure. The lighting device 300a may include a body with a front cavity 310 and a back cavity 320. The front cavity may include one or more light-emitting devices (such as a panel or array of light-emitting diodes (LEDs)). In some embodiments, the front cavity 310 may include multiple panels of LEDs facing the front of the lighting device 300a. The back cavity 320 may include one or more light-emitting devices (such as a panel or array of light-emitting diodes (LEDs)). In some embodiments, the back cavity 320 may include multiple panels of LEDs facing the front of the lighting device 300a.

In some embodiments, the lighting device 300a may include one or more buttons or other user interface components. For example, a first button 312 may be positioned towards the front of the lighting device 300a, and a second button 322 may be positioned towards the back of the lighting device 300a. By interacting with the buttons, operation of the lighting device 300a may be invoked or modified. For example, pressing the first button 312 once may turn lights of the lighting device 300a on; pressing the first button 312 a second time and/or successive presses may transition between pre-programmed light patterns or flashing techniques (e.g., solid white light, flashing white light, flashing red and blue, random flashing, etc.) for the lights of the lighting device 300a; pressing the first button 312 a third time (or pressing and holding the first button 312, etc.) may turn the lights of the lighting device 300a off. In some embodiments, interacting with the first button 312 may affect operation of lights in the front cavity 310 of the lighting device 300a and the second button 322 may affect operation of the back cavity 320 of the lighting device 300a. While example modifications of operation have been provided, any type, duration, pattern, etc. of interacting with the buttons 312 and/or 322 is contemplated. Additionally, the operations/interactions of the lights of the front cavity 310 and the lights of the back cavity 320 may be different. For example, the lights of the front cavity 310 may operate among various flashing patterns and the lights of the back cavity 320 may operate in a mode of being solidly on without flashing.

Figure 4A:
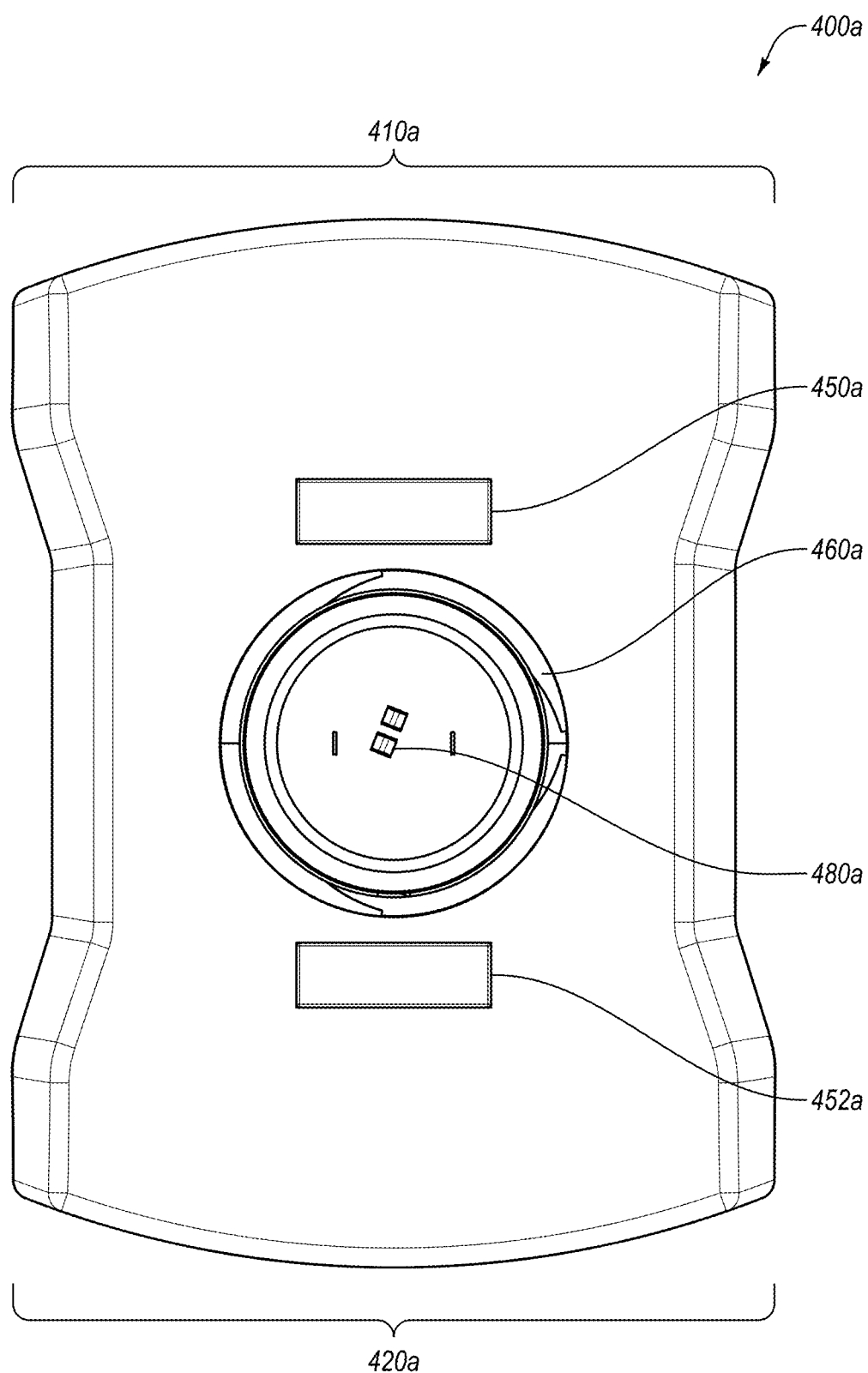
FIGS. 4A, 4B, and 4C illustrate views of bottom faces of various example lighting devices.
Figure 4B:
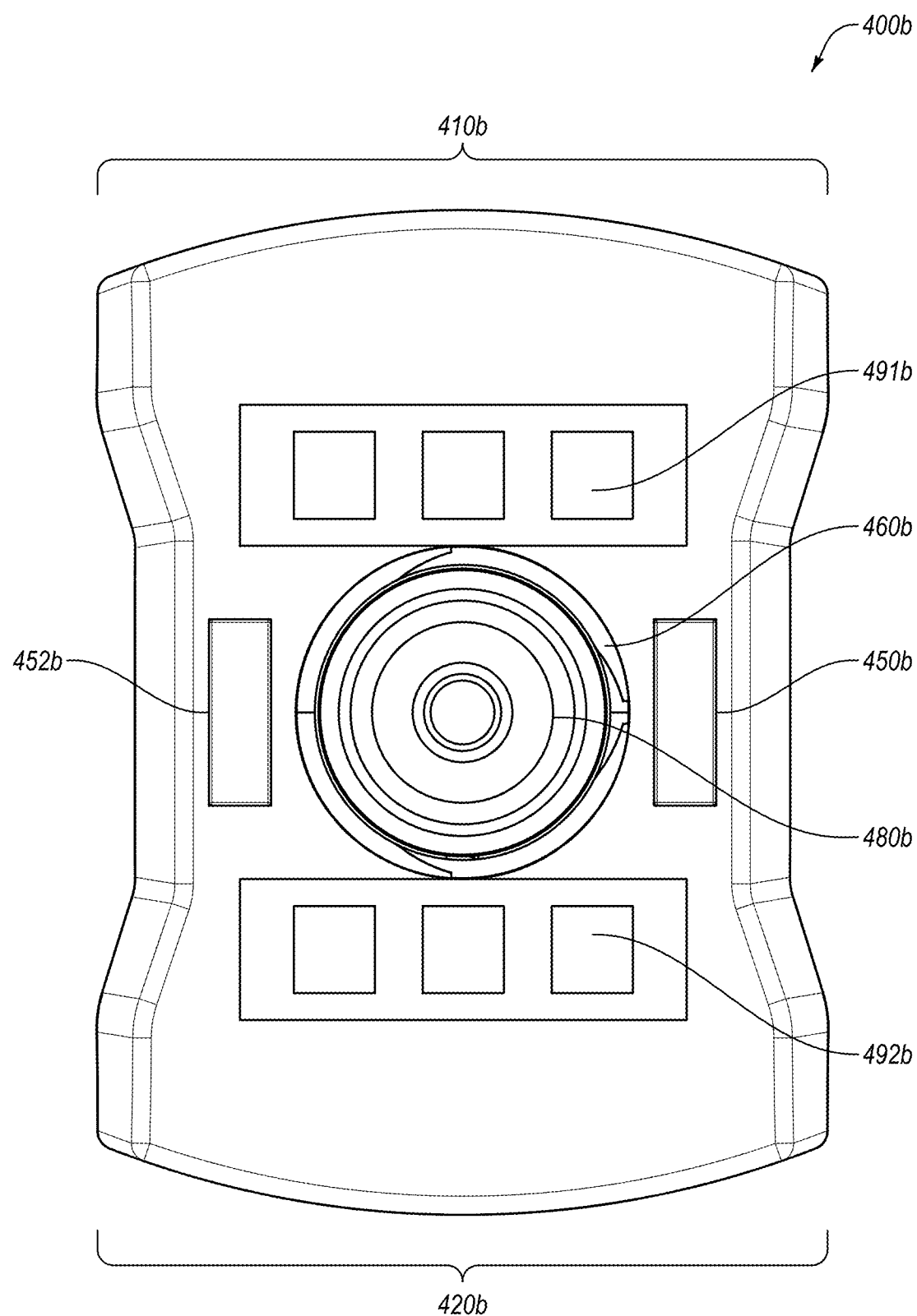

In some embodiments, the lighting device 300a may include a power source such as a rechargeable battery to power lighting device 300a. In these and other embodiments, the lighting device 300a may include a coupling mechanism between the rechargeable battery disposed within the body of the lighting device 300a, and a power source external to the body of the lighting device 300a, such as one or more electrodes (examples of which are illustrated in FIGS. 4A and 4B). In some embodiments, the lighting device 300a may include a rechargeable battery or batteries with sufficient power to operate the lighting device 300a at maximum brightness for a designated period of time, such as approximately two hours, three hours, four hours, five hours, eight hours, etc. In some embodiments, the duration of run time may be based on one or more regulations.

As illustrated in FIG. 3B, the lighting device 300a may include one or more removable covers 370 (such as the removable covers 370a and 370b). The removable covers 370 may permit access to the body of the lighting device 300a. For example, the removable covers may be unscrewed and removed to access the internal components of the lighting device 300a, such as the rechargeable battery/batteries of the lighting device 300a. In some embodiments, the removable covers 370 may be lined with a material to facilitate the water resistance, water proof, dust proof, mold proof, aspects of the lighting device 300a.

One or more benefits of methods, systems, or devices consistent with the present disclosure include an ability to quickly deploy lighting devices that include the longevity of run time of the lighting device 300a, and adequate brightness to give oncoming distracted drivers early stage notice that the drivers are coming upon an accident. In some embodiments, the lighting device 300a may be designed to meet requirements of one or more regulatory bodies, such as the Department of Transportation (DOT) or their equivalent. For example, such regulatory bodies may include specifications to have lights attached to traffic cones with a locking system that may prohibit the lighting device 300a from becoming a flying projectile in the event of the traffic cone being hit by on oncoming vehicle. In some embodiments, the lighting device 300a may operate as a first responder warning system, and may be designed specifically for first responders.

Figure 6:
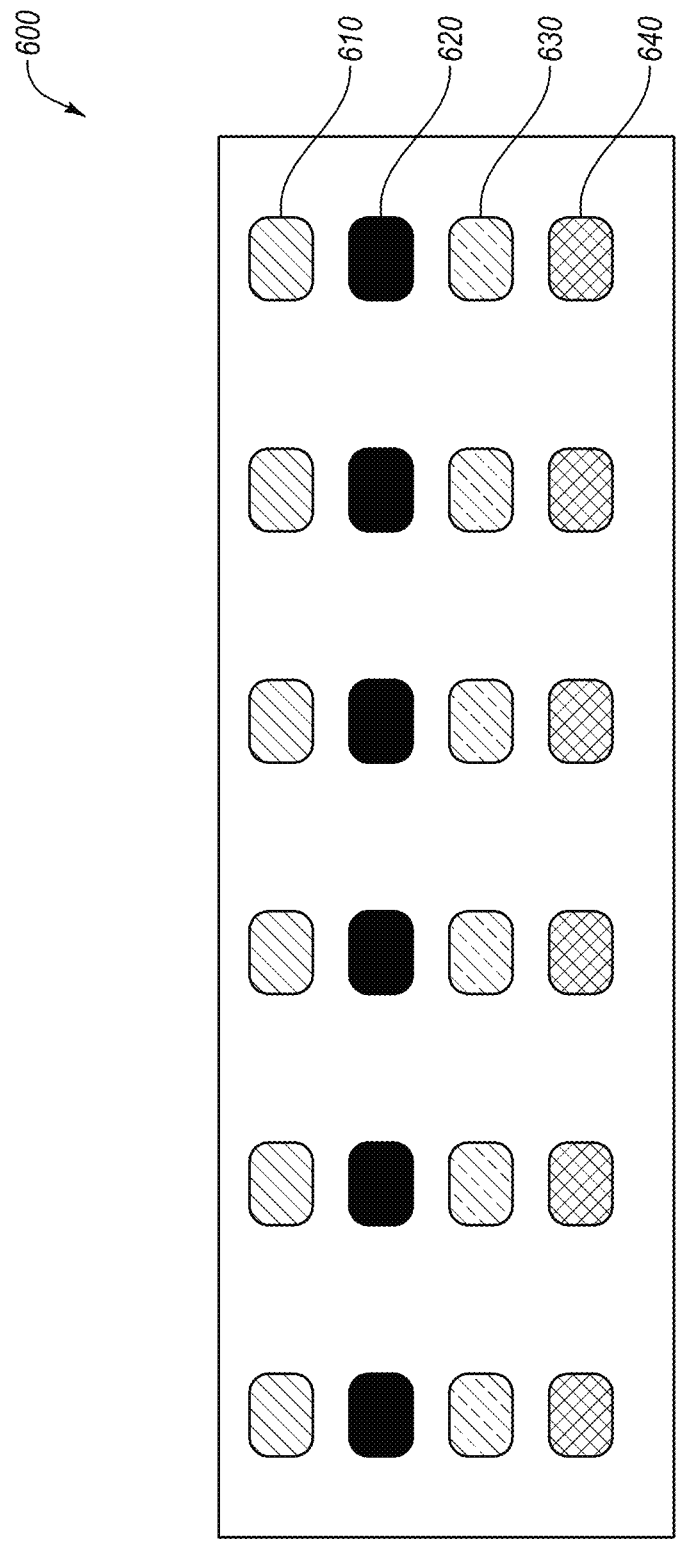
FIG. 6 illustrates an example array of lights of a lighting device.

In some embodiments, the panels of LEDs may include one or multiple colors of LEDs. The lighting device 300a may be configured to emit light in a specific color, in a specific pattern, or both. An example of such a panel of LEDs is illustrated in FIG. 6.

In addition to or alternative to the buttons 312 and/or 322 on a top face of the lighting device 300a, the top face may include a window 340. The window 340 may operate to provide access or communication between a wireless communication device of the lighting device 300a and a remote device. For example, an infrared (IR) transmitter may send signals to the lighting device 300a regarding operation thereof, and may be received through the window 340. In these and other embodiments, the body of the lighting device 300a may be made of a material that blocks or attenuates wireless communication signals. While the use of IR is described, any other wireless communication modality is also contemplated, such as Near Field Communications (NFC), BLUETOOTH®, radio frequency (RF), etc.

In some embodiments, the lighting device 300a may utilize a steady-on white light. In these and other embodiments, the lighting device 300a can be used to light a helicopter landing zone, a trail for first responders, or a vehicle that has gone off the side of the road and needs to have lights attached to it that helps other Emergency Service Responders to see the accident and respond accordingly. In some embodiments, the lighting device 300a may be utilized in situations and/or circumstances where flammable flares will not work.

As illustrated in FIG. 3B, the lighting device 300a, may include one or more features to operate as an attachment mechanism such that the lighting device 300a may be coupled to a traffic cone. For example, the bottom face of the lighting device 300a includes a threaded portion 360. The threaded portion 360 may operate as a female threaded coupling mechanism to interface with a male threaded coupling, such as the male threaded coupling of the cone attachment member 110 of FIGS. 1A and 1B. In some embodiments, the threaded portion 360 may include a lip 362 towards the end of the threaded portion 360 that may interface with a lip of the male threaded coupling, such as with the lip 112 of the cone attachment member 110 of FIGS. 1A and 1B. As with the cone cap 210 of FIGS. 2A and 2B, the interaction of the lips at the end of the threaded interactions may lock the lighting device 300a to a traffic cone.

Rather than a female threaded portion, in some embodiments the lighting device 300a may include a male portion of an attachment mechanism to couple with a traffic cone. For example, the male portion may include a male threaded portion, or posts that may interact with slots or grooves in a female portion associated with the traffic cone such that the lighting device 300a may be twisted and then locked into place.

In some embodiments, the attachment mechanism of the lighting device 300a (e.g., the threaded portion 360) may be utilized to couple the lighting device 300a to any other device or component, such as a charging device, an extended battery pack, and/or a secondary light. In these and other embodiments, the other device or component may include the complementary attachment mechanism.

In some embodiments, the attachment mechanism, may include a slope to the threaded portion 360. For example, the threaded portion 360 may slope inwardly or outwardly and a cone attachment member to which the threaded portion 360 interfaces may have a corresponding but opposite slope, or a slope that is varied from the slope of the threaded portion 360 (e.g., varied by 5%, 10%, or 15%). In some embodiments, by utilizing the variation in slope, as the devices are screwed together, the interference fit may become tighter and tighter due to the variation in slope between the two interfacing components.

In some embodiments, the lighting device 300a may be configured in any size or shape. For example, as illustrated in FIGS. 3A and 3B, the lighting device 300a may include a slightly convex curved front and back edge of the body, and a slightly concave curved side portion of the body. In some embodiments, the lighting device 300a may be between 100 and 150 mm in length and in width, and between approximately 30 and 60 mm in height. In some embodiments, the lighting device 300a may be approximately 127 mm in length and 121 mm in width. Additionally or alternatively, the lighting device 300a may be approximately 51 mm in height.

In some embodiments, the body of the lighting device 300a may be made of a durable material able to receive an impact and still be operable. For example, the lighting device 300a may be made of a material such as a high impact nylon material. Additionally or alternatively, the lighting device 300a may include a durable and clear material covering the lights themselves, such as polycarbonate clear lenses. In some embodiments, the lighting device 300a may be constructed or treated in a manner to be water resistant or waterproof. For example, the lighting device 300a may be sonic welded and sealed to increase water resistance.

In some embodiments, the lighting device 300a may include a charging indicator for the lighting device 300a, such as LEDs or other indicators that may be activated to indicate whether or not the lighting device 300a is charging and/or a state of charge (e.g., 25%, 50%, 75%, 100% charged).

As illustrated in FIG. 3B, in some embodiments, the lighting device 300a may include one or more magnets, such as magnets 350 and 352, coupled to the bottom face of the lighting device 300a. In these and other embodiments, the magnets 350 and 352 may be configured to be strong enough to keep the lighting device 300a securely attached to a metal surface, whether in a sideways or even upside down configuration. For example, the lighting device 300a may utilize the magnets 350 and/or 352 to be coupled to a vehicle such as an automobile, or some other metal surface like a guard rail. In these and other embodiments, the magnets 350 and/or 352 may extend further away from the bottom face of the lighting device 300a than any other components, such as the removable covers 370. Such extension may be any size, for example, from 0.0 mm to 5.0 mm, such as 0.5 mm.

Modifications, additions, or omissions may be made to the lighting device 300a without departing from the scope of the present disclosure. For example, the lighting device 300a may include more or fewer elements than those illustrated in FIGS. 3A and 3B. As another example, any type of attachment mechanism may be used by the lighting device 300a. As an additional example, the lighting device 300a may take any shape or form and still be consistent with the present disclosure.

Figure 3C:
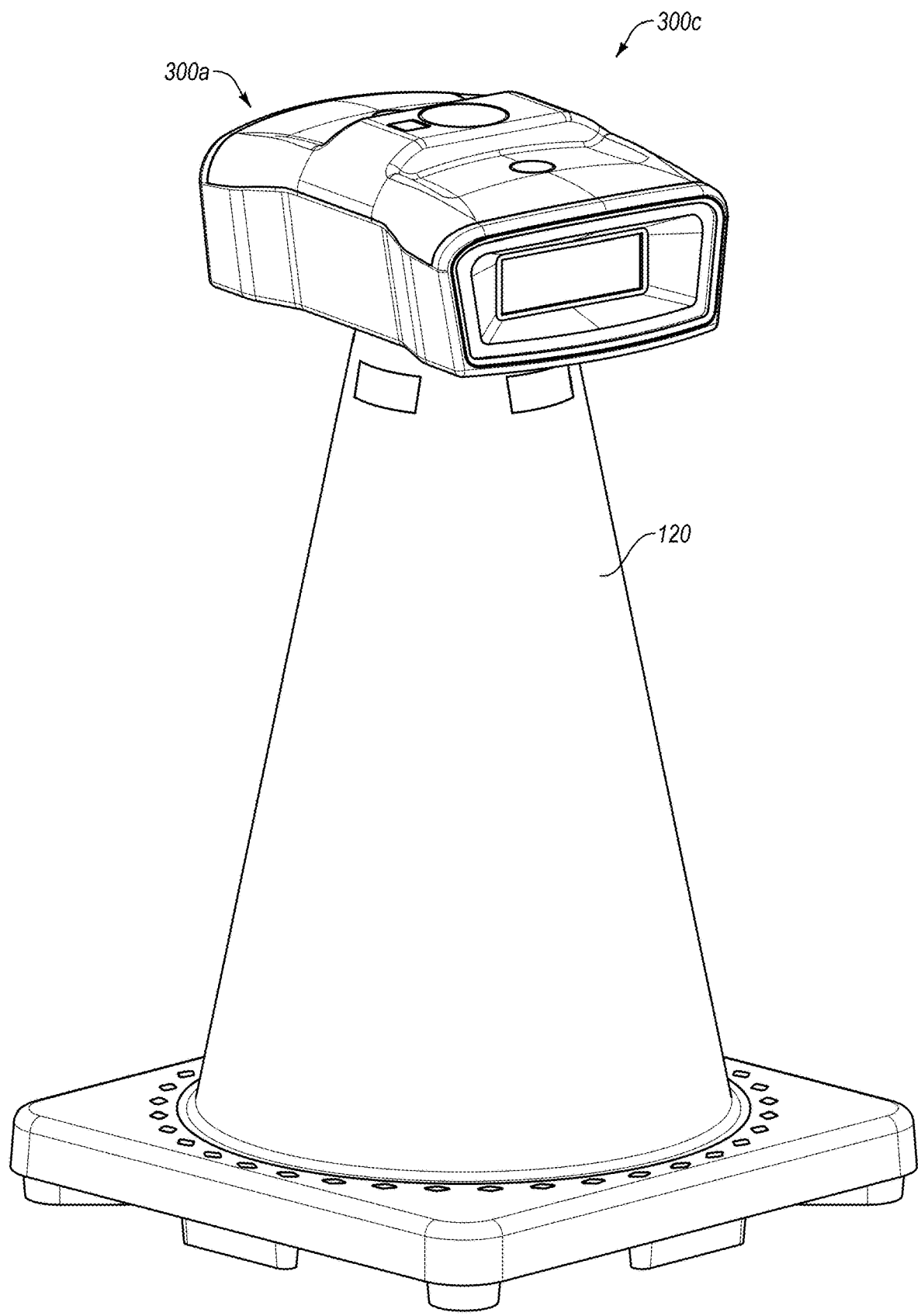
FIG. 3C illustrates an additional example traffic warning system that includes the lighting device of FIGS. 3A and 3B.

FIG. 3C illustrates an additional example traffic warning system 300c that includes the lighting device 300a of FIGS. 3A and 3B, in accordance with one or more embodiments of the present disclosure. For example, as illustrated in FIG. 3C, the lighting device 300a may be coupled to the cone 120 via the attachment member 110 of FIG. 1A (not seen in FIG. 3C).

Modifications, additions, or omissions may be made to the system 300c without departing from the scope of the present disclosure. For example, the system 300c may include more or fewer elements than those illustrated in FIG. 3C.

Figure 4C:
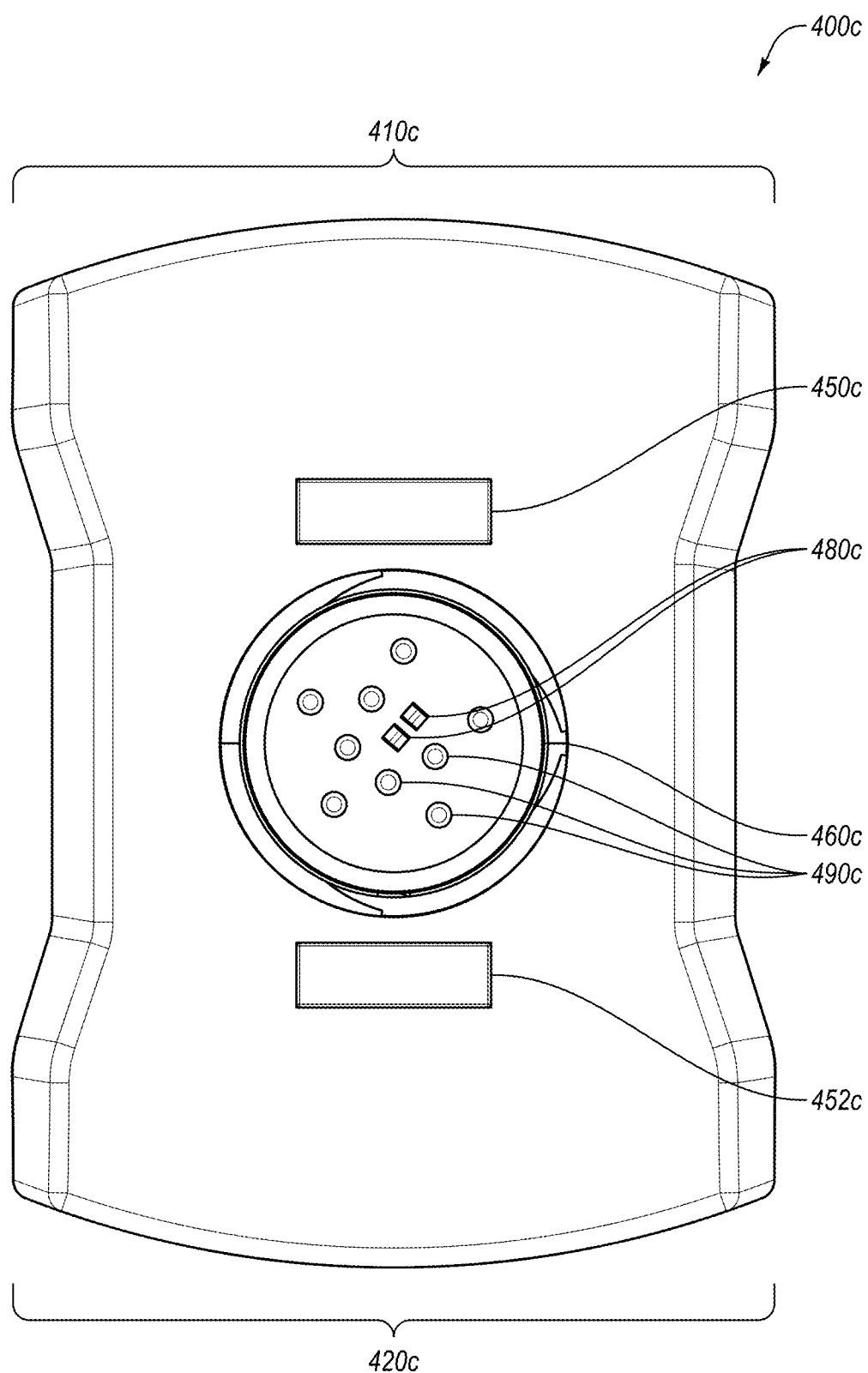

FIGS. 4A, 4B, and 4C illustrate views of bottom faces of various example lighting devices 400a, 400b, and 400c, respectively, in accordance with one or more embodiments of the present disclosure. The lighting devices 400a, 400b, and 400c may be similar or comparable to the lighting device 300a of FIGS. 3A and 3B, with variations as described below.

FIG. 4A illustrates the lighting device 400a that may include magnets 450a and 452a oriented towards a front cavity 410a and a back cavity 420a, respectively, of the lighting device 400a. The magnets 450a and 452a may operate in a similar or comparable manner and for a similar or comparable purpose as the magnets 350 and 352 of FIG. 3B.

The lighting device 400a additionally includes a threaded portion 460a that may be similar or comparable to the threaded portion 360 of FIGS. 3A and 3B. At a base of the threaded portion, the lighting device 400a may include electrode(s) 480a for charging the lighting device 400a. For example, the electrodes 480a may span a body of the lighting device 400a such that a rechargeable battery within the lighting device 400a may be electrically coupled to an external electricity source to recharge the rechargeable battery. Additionally or alternatively, the electrodes may couple to a secondary lighting device to power the secondary lighting device. As another example, the electrodes may couple to an extended battery pack to extend the operating life of the lighting device 400a.

FIG. 4B illustrates the lighting device 400b. The lighting device 400b may include a similar or comparable, front cavity 410b, back cavity 420b, threaded portion 460b, and magnets 450b and 452b to the front cavity 410a, back cavity 420a, threaded portion 460a, and magnets 450a and 452a, respectively of FIG. 4A.

The electrode(s) 480b of FIG. 4B are illustrated as two plates, rather than two contact points as illustrated for the electrodes 480a in FIG. 4A. Either are viable options and may be used as electrodes for electrically coupling the lighting devices 400a/400b to another device or component.

The magnets 450b and 452b are oriented at the sides of the threaded portion 460b, rather than towards the front or the back of the threaded portion 460a as illustrated in FIG. 4A.

The lighting device 400b may include one or more lights 491b and 492b. The lights 491b and 492b may be disposed on the bottom face of the lighting device 400b and far enough away from the threaded portion 460b that when coupled to a traffic cone, the lights 491b and/or 492b may illuminate the traffic cone from the outside by shining light on the outside surface of the traffic cone. The lights 491b and/or 492b may be controlled in operation in a similar or comparable manner to the lights of the front cavity 310 and/or the back cavity 320 of the lighting device 300a of FIGS. 3A and 3B. For example, the lights 491b and/or 492b may be optionally powered on, powered off, or set to emit light in a certain pattern, such as blinking with various amounts of delay between blinks and/or duration when the light is on.

FIG. 4C illustrates the lighting device 400c. The lighting device 400c may include a front cavity 410c, back cavity 420c, magnets 450c and 452c, threaded portion 460c, and electrodes 480c, similar or comparable to the front cavity 410a, back cavity 420a, magnets 450a and 452a, threaded portion 460a, and electrodes 480a, respectively, of FIG. 4A.

As illustrated in FIG. 4C, in some embodiments, the base of the threaded portion 460c may include one or more lights 490c configured to illuminate an inside of a traffic cone. For example, the lights 490c may be oriented such that as they are powered, they shine light down into a space within a traffic cone to which the lighting device 400c is coupled. In some embodiments, various components or devices may be used to direct the light towards the periphery of the cone, or such that the light is directed out and away from the cone, rather than towards the ground upon which the cone is resting.

Modifications, additions, or omissions may be made to the lighting devices 400a, 400b, and/or 400c without departing from the scope of the present disclosure. For example, the lighting devices 400a, 400b, and/or 400c may include more or fewer elements than those illustrated in FIGS. 4A, 4B, and/or 4C. Additionally, any variation or combination of features may be included in a lighting device consistent with the present disclosure. For example, a lighting device may include a male threaded portion rather than a female threaded portion as the attachment mechanism for coupling the lighting device to a traffic cone. In such an embodiment, lights on the attachment mechanism (e.g., the male threaded portion) may already be extended down into the traffic cone and so may be aimed or otherwise oriented towards a side of the cone. As another example, a lighting device may include magnets at the sides and the front, or lights on the outside of the cone and the inside of the threaded portion.

Figure 5A:
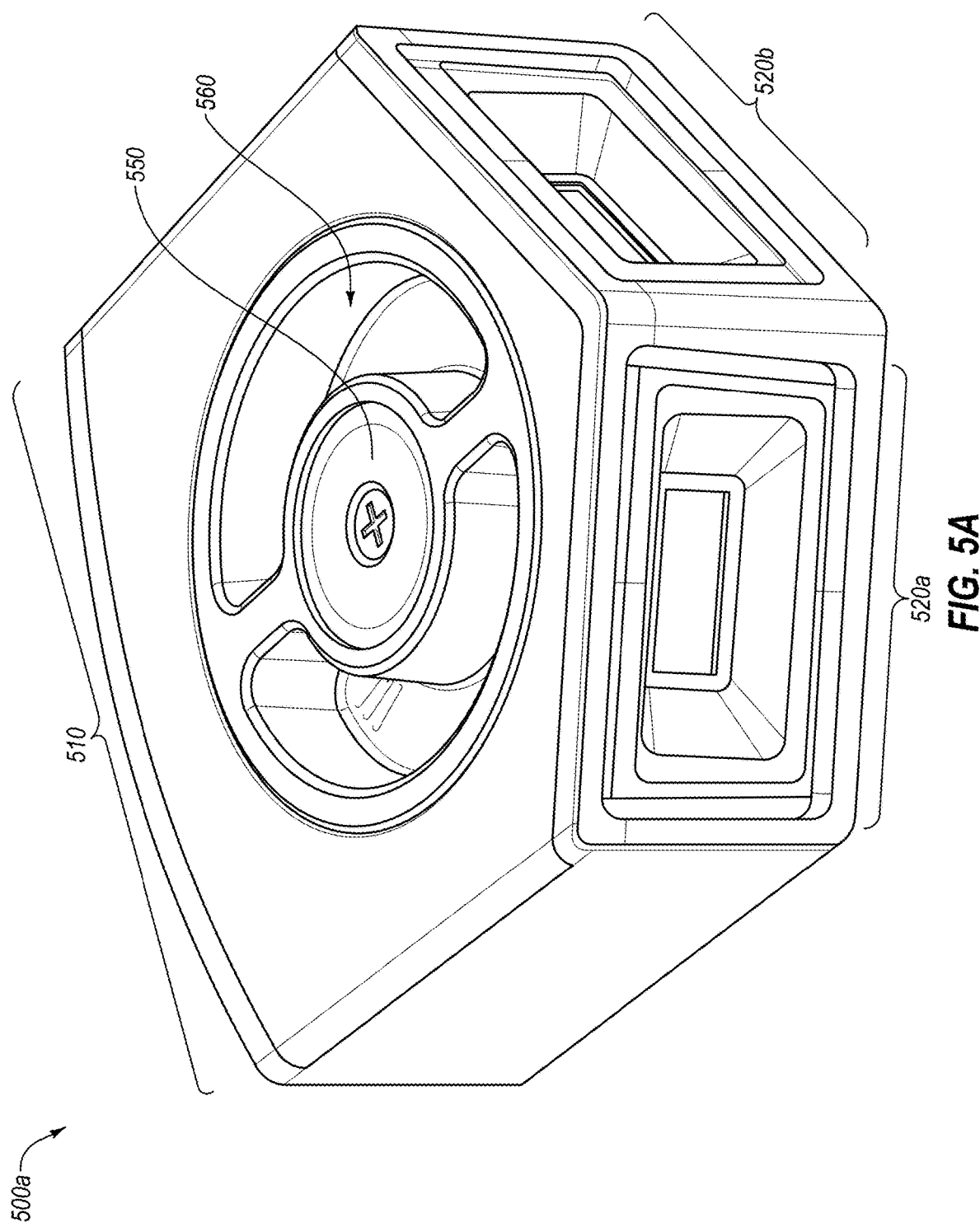
FIGS. 5A and 5B illustrate an additional example lighting device.
Figure 5B:
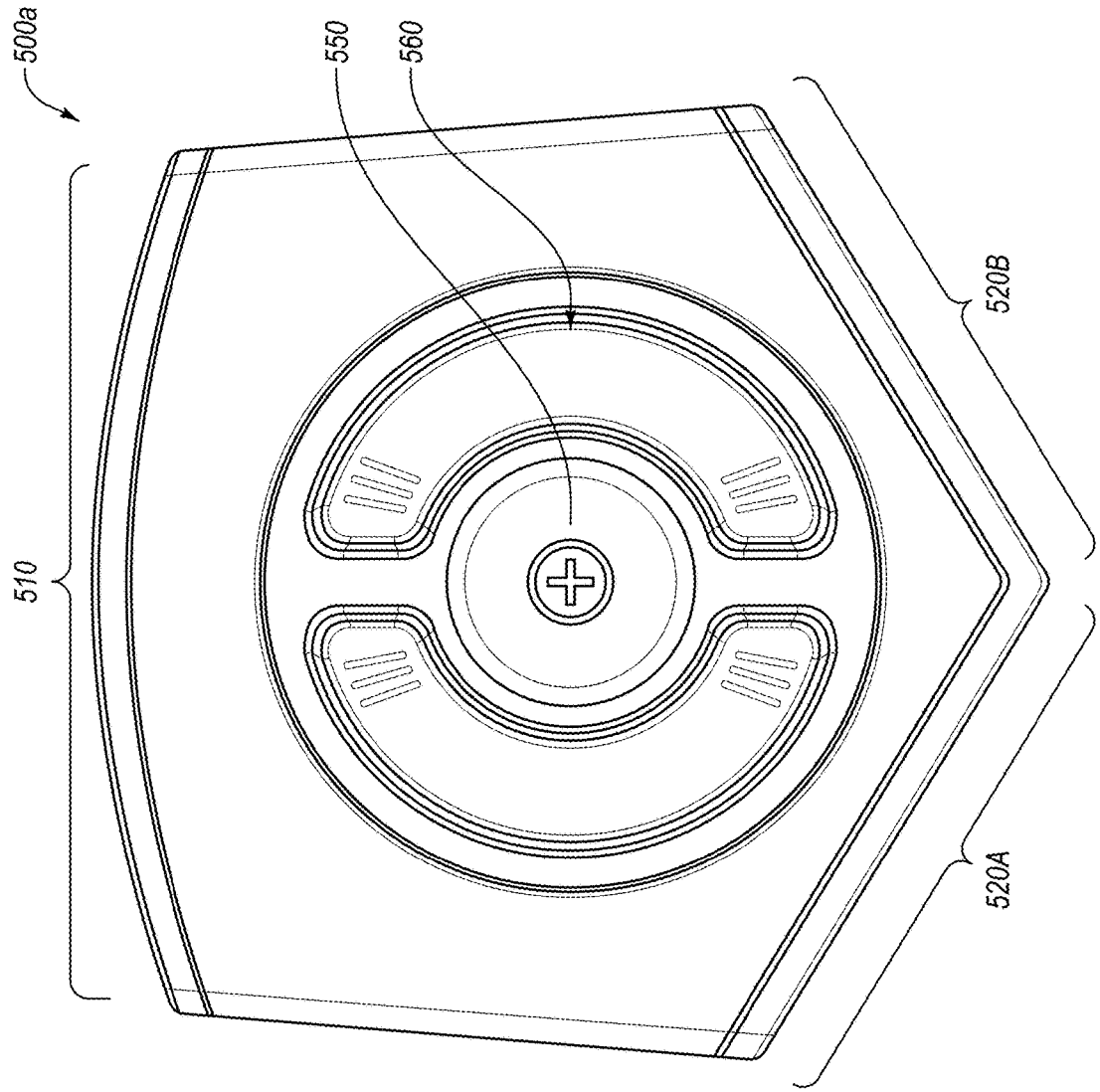

FIGS. 5A and 5B illustrate an additional example lighting device 500a, in accordance with one or more embodiments of the present disclosure. The lighting device 500a may operate in a comparable or similar manner to the lighting device 300a of FIGS. 3A and 3B. For example, the lighting device 500a may include lights in a front cavity 510 that may be powered on and/or set to a pattern of operation. As another example, the lighting device 500a may include one or more back cavities 520 (such as the back cavities 520a and 520b) with lights thereof that may be powered on and/or set to a pattern of operation. In some embodiments, the lights of the back cavities 520a and 520b may operate independently of each other. As illustrated in FIGS. 5A and 5B, in some embodiments the front cavity 510 may be oriented in a different facing direction than the back cavities 520a and/or 520b, while the lighting device 300a of FIGS. 3A and 3B may have the front cavity 310 and the back cavity 320 oriented in generally the same direction, although with openings facing generally opposite directions.

As illustrated in FIGS. 5A and 5B, the lighting device 500a may utilize a magnet 550 to operate as an attachment mechanism to couple the lighting device 500a to a traffic cone. For example, the magnet 550 may be shaped and oriented to couple with the metal disk 212 of the cone cap 210 of FIG. 2A. Additionally or alternatively, the magnet 550 may be replaced with a metal component configured to interface and couple with a magnet associated with a traffic cone.

In some embodiments, the lighting device 500a may include a removable casing 560 that may allow access to the internal components of the lighting device 500a. For example, the removable casing 560 may cover a battery compartment in which single use or rechargeable batteries may be accessed.

Figure 5C:
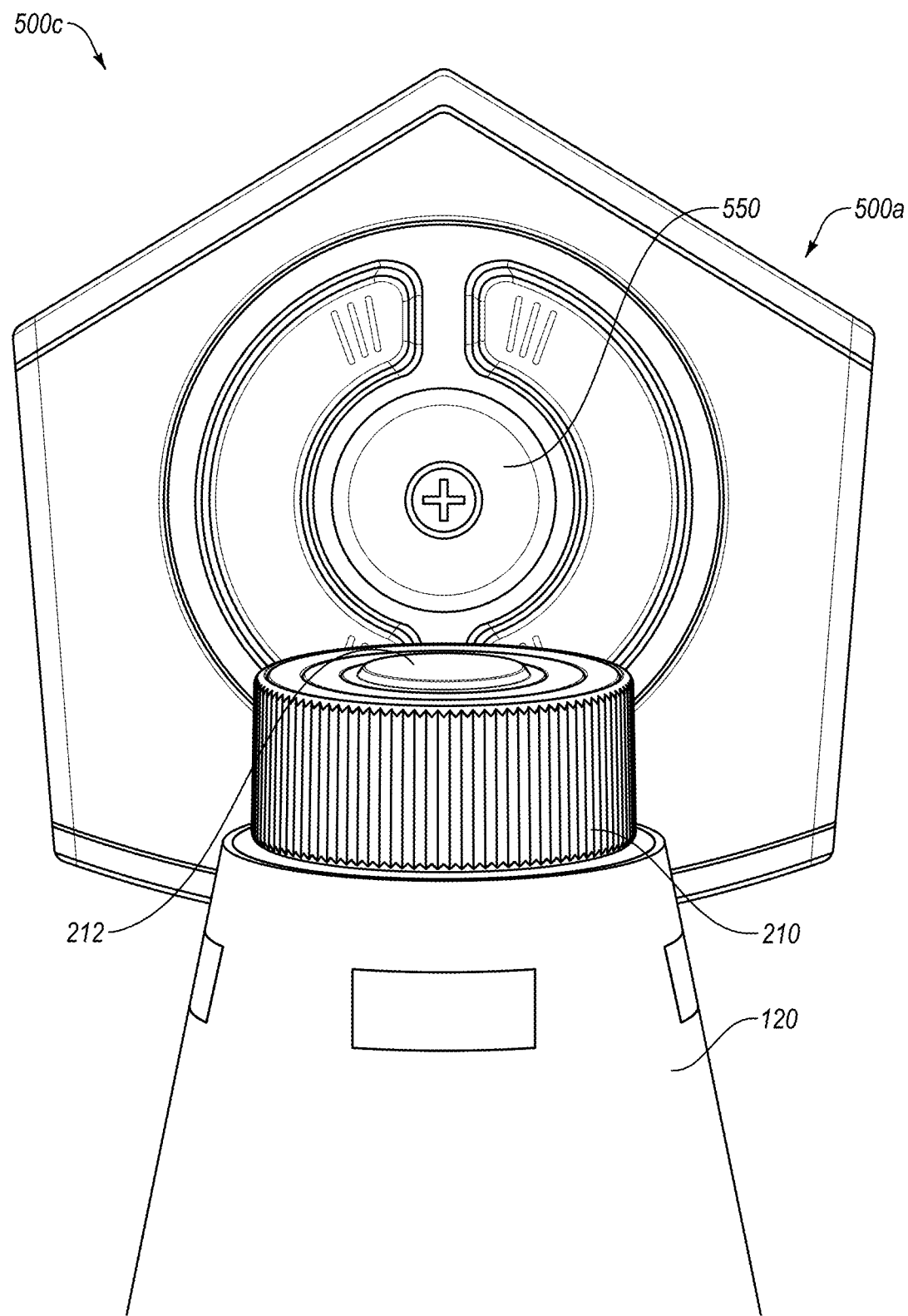
FIG. 5C illustrates an additional example traffic warning system that includes the lighting device of FIGS. 5A and 5B.

FIG. 5C illustrates an additional example traffic warning system 500c that includes the lighting device 500a of FIGS. 5A and 5B coupled to a traffic cone 120, in accordance with one or more embodiments of the present disclosure. For example, the traffic cone 120 may have a cone cap 210 coupled thereto. The metal disk 212 of the cone cap may interface with the magnet 550 to securely couple the lighting device 500a to the traffic cone 120 via the cone cap 210. In some embodiments, the cone cap 210 may include a magnet with the same polarity as the magnet 550 in a band along the outside of the cone cap 210 such that the magnet 550 is guided towards the middle of the cone cap 210.

Modifications, additions, or omissions may be made to the lighting device 500a and/or the traffic warning system 500c without departing from the scope of the present disclosure. For example, the lighting device 500a and/or the system 500c may include more or fewer elements than those illustrated in FIGS. 5A-5C. For example, the lighting device 500a may be modified to include any of the features described above with reference to the lighting devices 300a and/or 400a-400c.

FIG. 6 illustrates an example array of lights 600 of a lighting device, in accordance with one or more embodiments of the present disclosure. The array of lights 600 may be deployed in one of the cavities of the lighting devices of the present disclosure, such as the front cavities 310, 410a-c, and/or 510, and/or the back cavities 320, 420a-c, and/or 520a-b.

In some embodiments, the array of lights 600 may include a red light 610, blue light 620, white light 630, and/or orange/amber light 640. In some embodiments, the array of lights 600 may include light-emitting diode (LED) lights, organic LEDs (OLEDs), incandescent lights, fluorescent (e.g., compact fluorescent (CF)), etc. In some embodiments, the lights may be arranged in the following pattern:

| Red | Red | Red | Red | Red | Red |
| Orange | Orange | Orange | Orange | Orange | Orange |
| White | White | White | White | White | White |
| Blue | Blue | Blue | Blue | Blue | Blue |

Such a pattern may allow for bouncing patterns between colors (e.g., a top left "Red" and a bottom right "Blue").

Modifications, additions, or omissions may be made to the array of lights 600 without departing from the scope of the present disclosure. For example, the array of lights 600 may include more or fewer elements than those illustrated in FIG. 6. For example, the array of lights 600 may be modified to include any number of lights with any number of colors. Additionally, the array of lights 600 may be configured in any shape or profile. For example, as illustrated in FIG. 4C, the array may cover a circular area with the individual lights in a star-shaped configuration. Any shape is contemplated within the scope of the present disclosure.

Figure 7:
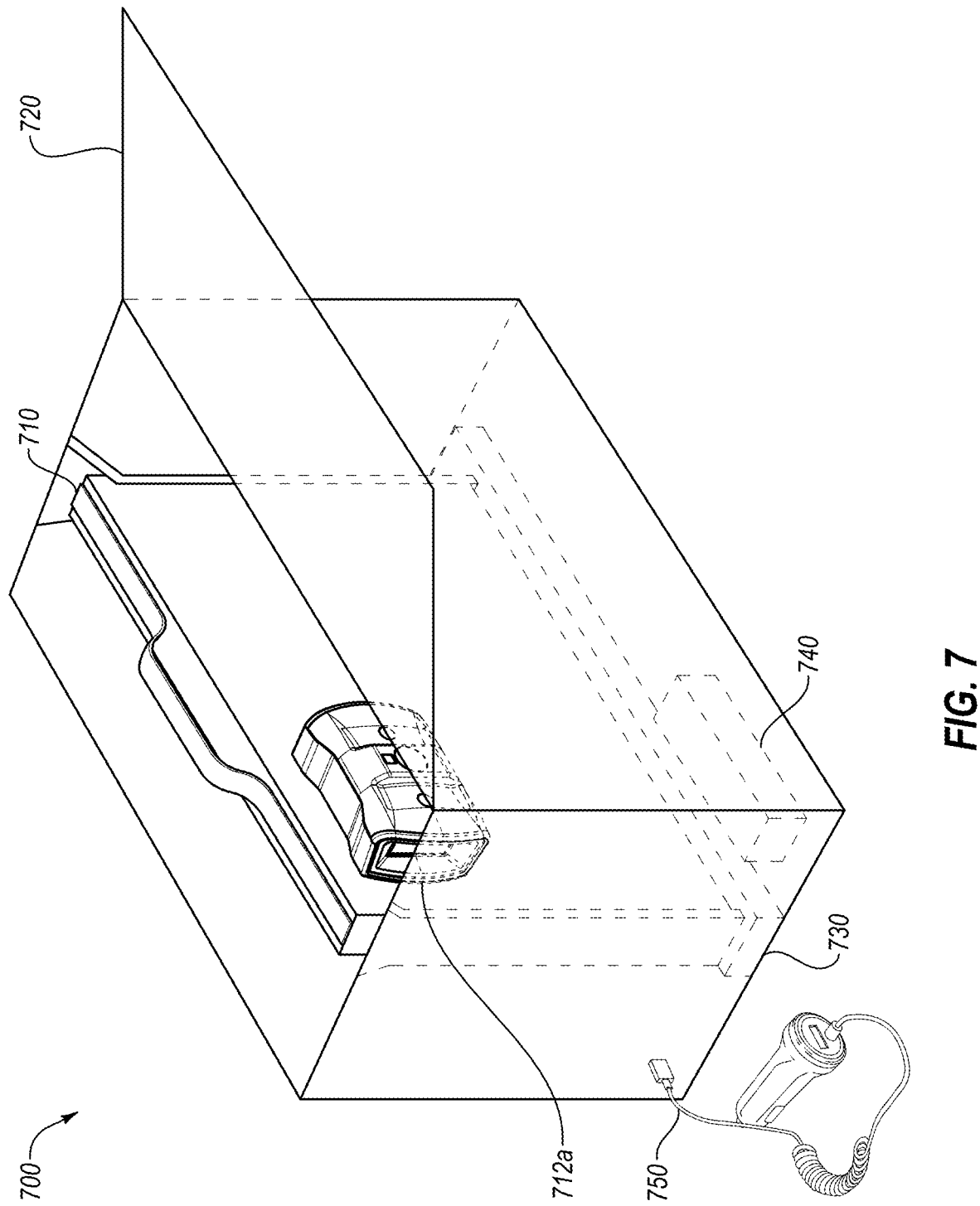
FIG. 7 illustrates another example traffic warning system including an example case.

FIG. 7 illustrates another example traffic warning system including an example case 700, in accordance with one or more embodiments of the present disclosure. The case 700 may be configured to hold and/or carry multiple lighting devices 712, such as lighting device 712a.

The case 700 may include a lid 720 that may be movable to access the lighting devices 712 within the case. In some embodiments, the case 700 may include one or more trays 710 of the lighting devices 712. In some embodiments, the trays 710 may be removable from the case 700. The trays 710 may interface with a dock 730 within the case 700. The dock may include a physical coupling to lock the tray 710 into the case 700, such as with snaps, interlocking members, an interference fit, etc. Additionally or alternatively, the tray 710 may be electrically coupled to the case 700 via the dock 730. For example, the dock 730 may include electrical connectors such that electrical power associated with the case 700 may be utilized by the tray 710 and/or lighting devices 712 coupled to the tray 710. In some embodiments, the case may include a rechargeable unit, such as a battery 740, and/or a power cord 750. The power from the case 700 may recharge a battery of the tray 710, and/or recharge the lighting devices 712. In some embodiments, the case 700 may provide power to recharge one or more lighting devices 712, extended battery packs, and/or secondary lights. In some embodiments, the tray 710 and/or the case 700 may be configured to charge one or more components, light devices 712, extended battery packs, secondary lights, etc. via inductive charging. Additionally or alternatively, the tray 710 and/or the case 700 may include an electrode or other contact point configured to contact a corresponding electrode or contact point on the light devices 712, extended battery packs, secondary lights, etc. to transfer electricity from the tray 710 and/or the case 700.

The battery 740 may be configured to be recharged using the power cord 750. The battery 740 may provide power to the tray 710 and/or to the lighting devices 712.

The power cord 750 may be configured to couple with a 12 volt direct current (DC) power source, or other power source that may be available in remote situations, or available in a vehicle. In some embodiments, the power cord 750 may be configured to plug into a cigarette lighter outlet or other similar or comparable power port in a vehicle. Additionally or alternatively, the power cord 750 may be configured to interface with a traditional outlet, such as an alternating current (AC) outlet operating at 115 V, 120 V, 220 V, 230 V, etc.

In some embodiments, the case 700 may include a set of four, six, eight, ten, twelve, twenty, or any other number of lighting devices 712. In some embodiments, the case 700 may be stored primarily in the trunk of a public safety vehicle; however, such a system has the flexibility to be in other locations of a vehicle with access to a 12 V DC power outlet. Additionally or alternatively, in some embodiments the case 700 may be directly wired into an electrical system for a vehicle. In some embodiments, the case 700 may include a DC to AC adapter, such as an adapter to convert 12 V DC power from the vehicle into 120 V AC power to charge or otherwise power one or more components or devices stored within the case.

In some embodiments, the lighting devices 712 of the case 700 may operate cooperatively. For example, the lighting devices 712 may be configured to communicate with each other and/or a remote using an RF signal. For example, the lighting devices 712 may wirelessly communicate with one another to generate a pattern of light among the devices. Additionally or alternatively, the sequence of lights, patterns of lights, etc. may be modified by an RF remote. Additionally or alternatively, the pattern and/or color of light for a single lighting device 712 may be modified in such a manner. Examples of such communication, etc. may be described with reference to FIG. 15.

Figure 10:
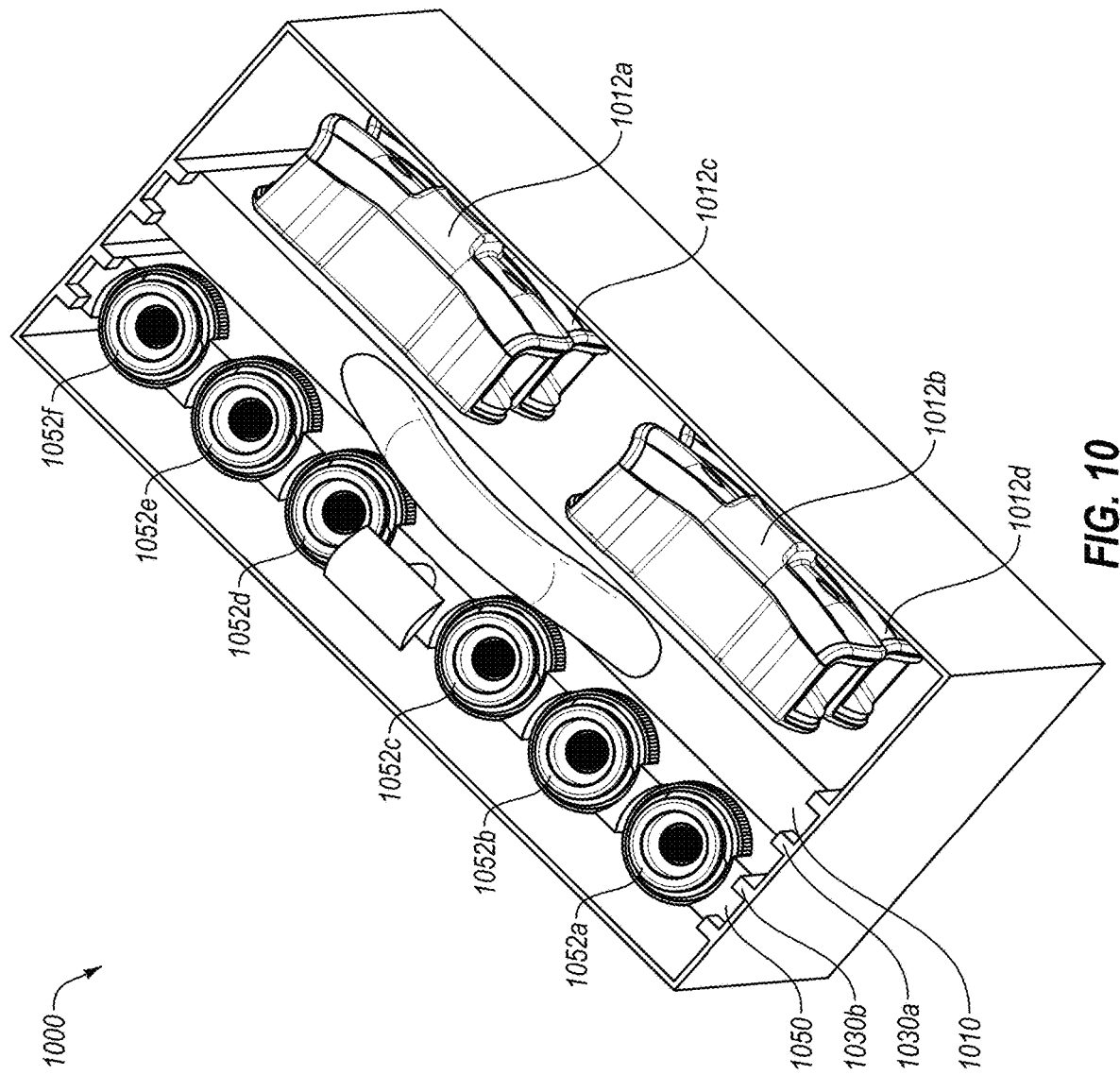
FIG. 10 illustrates another example traffic warning system including another example case.
Figure 11:
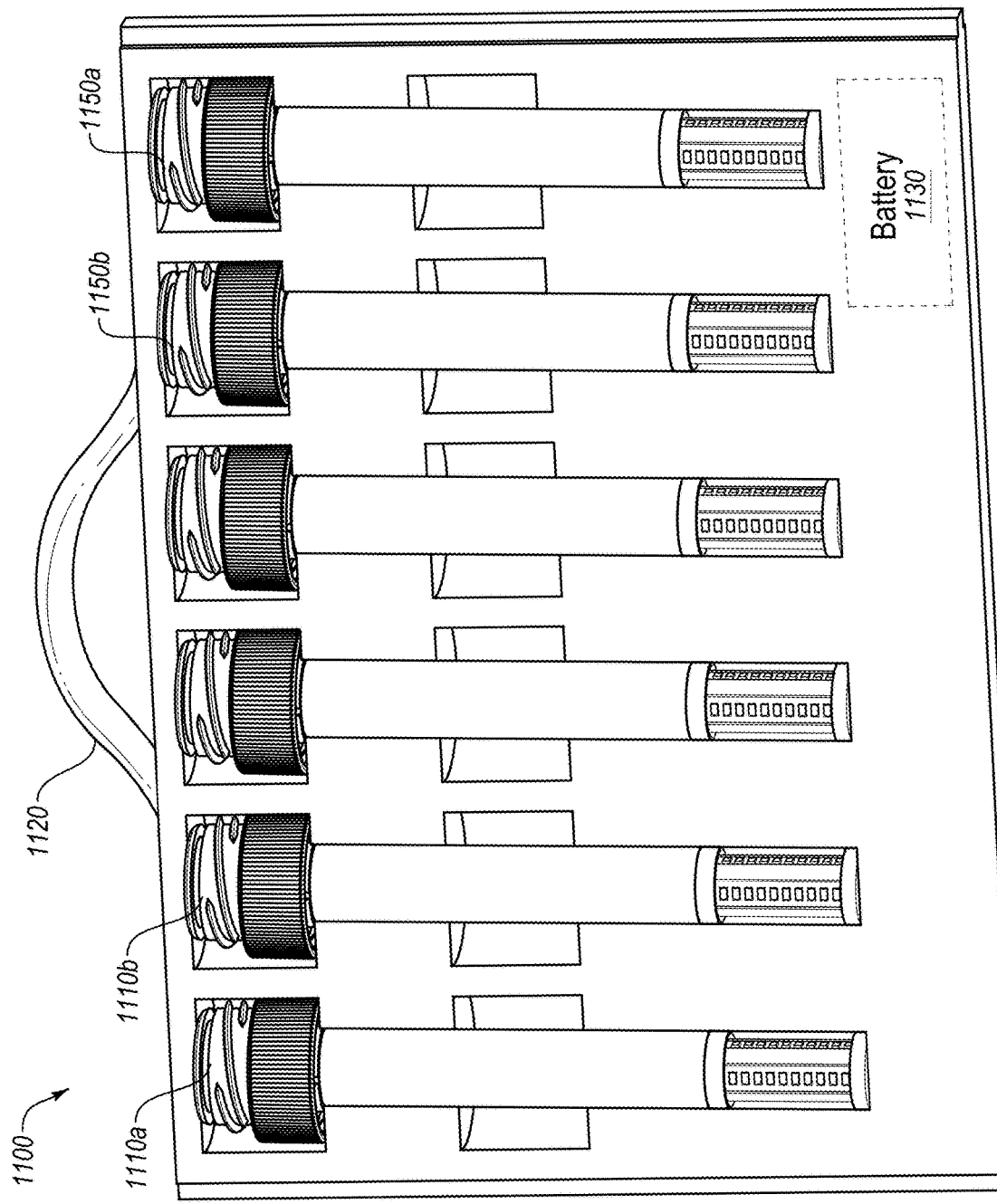
FIG. 11 illustrates another example tray of another example traffic warning system.

Modifications, additions, or omissions may be made to the case 700 without departing from the scope of the present disclosure. For example, the case 700 may include more or fewer elements than those illustrated in FIG. 7. For example, the case 700 may include multiple trays 710 and/or any number of lighting devices 712. As another example, the case 700 may include any number of extended battery packs and/or secondary lights (an example of which is illustrated in FIGS. 10 and 11).

Figure 8:
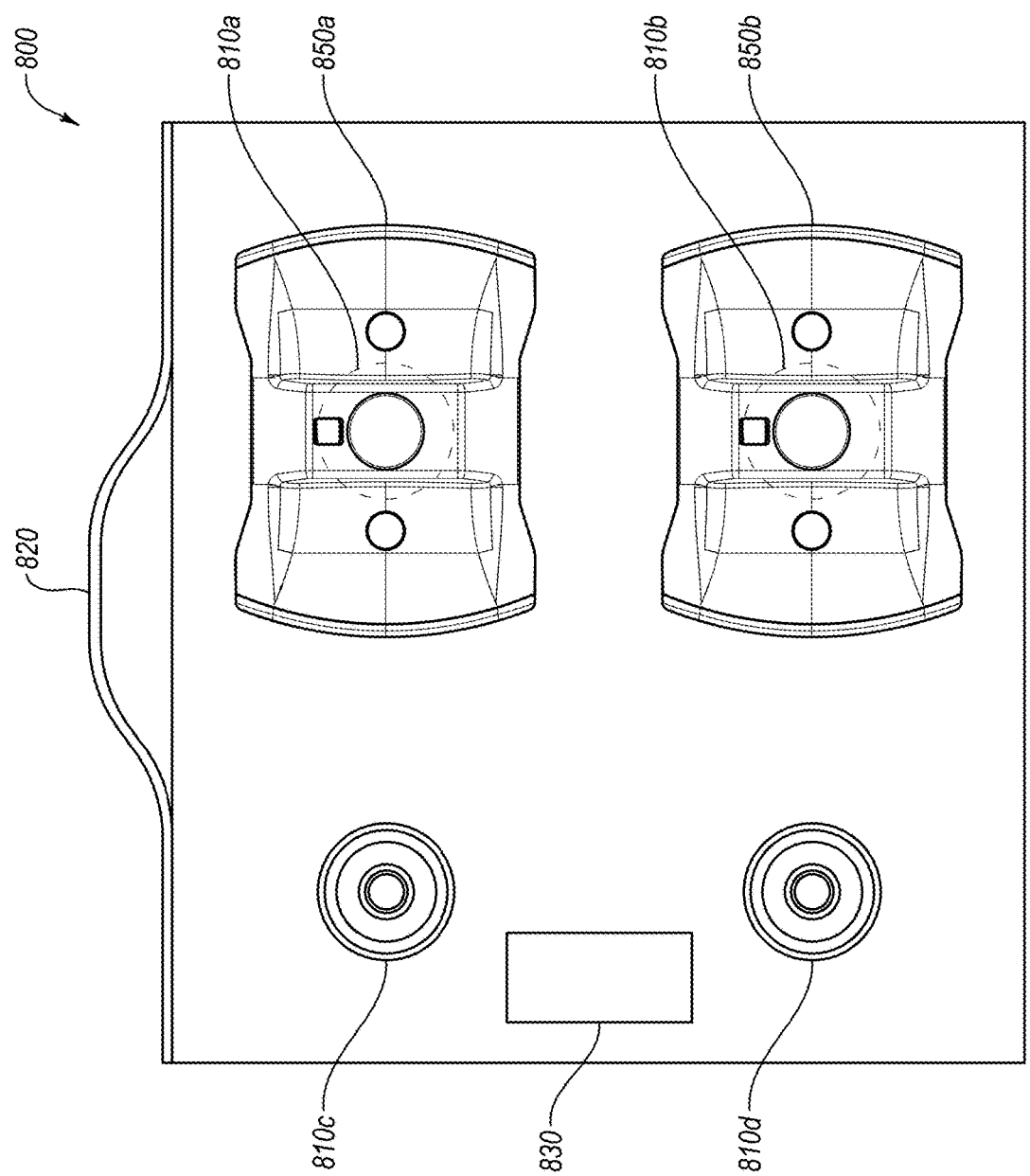
FIG. 8 illustrates an example tray of an example traffic warning system.

FIG. 8 illustrates an example tray 800 of an example traffic warning system, in accordance with one or more embodiments of the present disclosure. The tray 800 may be similar or comparable to the tray 710 of FIG. 7. The tray 800 may include any number of charging ports 810 (such as charging ports 810a-810d), a handle 820, a battery 830, and any number of lighting devices 850 (such as lighting devices 850a and 850b).

In some embodiments, the charging ports 810 may include posts or other electrical contacts that may lock or otherwise engage with one or more components of the lighting devices 850. Additionally or alternatively, the charging ports may include an attachment mechanism (such as a male threaded portion and/or a female threaded portion) to securely couple the lighting devices 850 to the tray 800. In these and other embodiments, the charging ports 810 may be similar or comparable to the attachment mechanism for coupling the lighting devices to a traffic cone. In some embodiments, the charging ports 810 may also be configured to couple with extended battery packs and/or secondary lights, and may utilize the same or a different attachment mechanism to do so. By using a similar attachment mechanism, a single port may be used to charge the lighting devices 850 and to couple them to a traffic cone when deployed.

The handle 820 may be shaped and/or configured to carry the tray 800 and/or remove the tray 800 from a case (such as the case 700 of FIG. 7). For example, a user may be able to grasp the handle and pull the tray out of the case.

The battery 830 may be configured to be electrically coupled to the charging ports 810 such that even when the tray 800 is not disposed within a case, the tray 800 may continue to provide power to the charging ports 810 to recharge the batteries of the lighting devices 850. In some embodiments, the tray 800 may or may not include the battery 830.

In some embodiments, the tray 800 may include one or more charging indicators for the lighting devices 850 of the tray 800, such as LEDs or other indicators that may be activated to indicate whether or not the lighting devices 850 are charging and/or a state of charge (e.g., 25%, 50%, 75%, 100% charged). Additionally or alternatively, such a charging indicator may be included for the battery 830 of the case.

Modifications, additions, or omissions may be made to the tray 800 without departing from the scope of the present disclosure. For example, the tray 800 may include more or fewer elements than those illustrated in FIG. 8. For example, the tray 800 may not include the battery 830. As another example, the tray 800 may include any number of charging ports 810, such as six, eight, ten, twelve, or twenty. As another example, the tray 800 may carry any number of extended battery packs and/or secondary lights (an example of which is illustrated in FIG. 11).

Figure 9A:
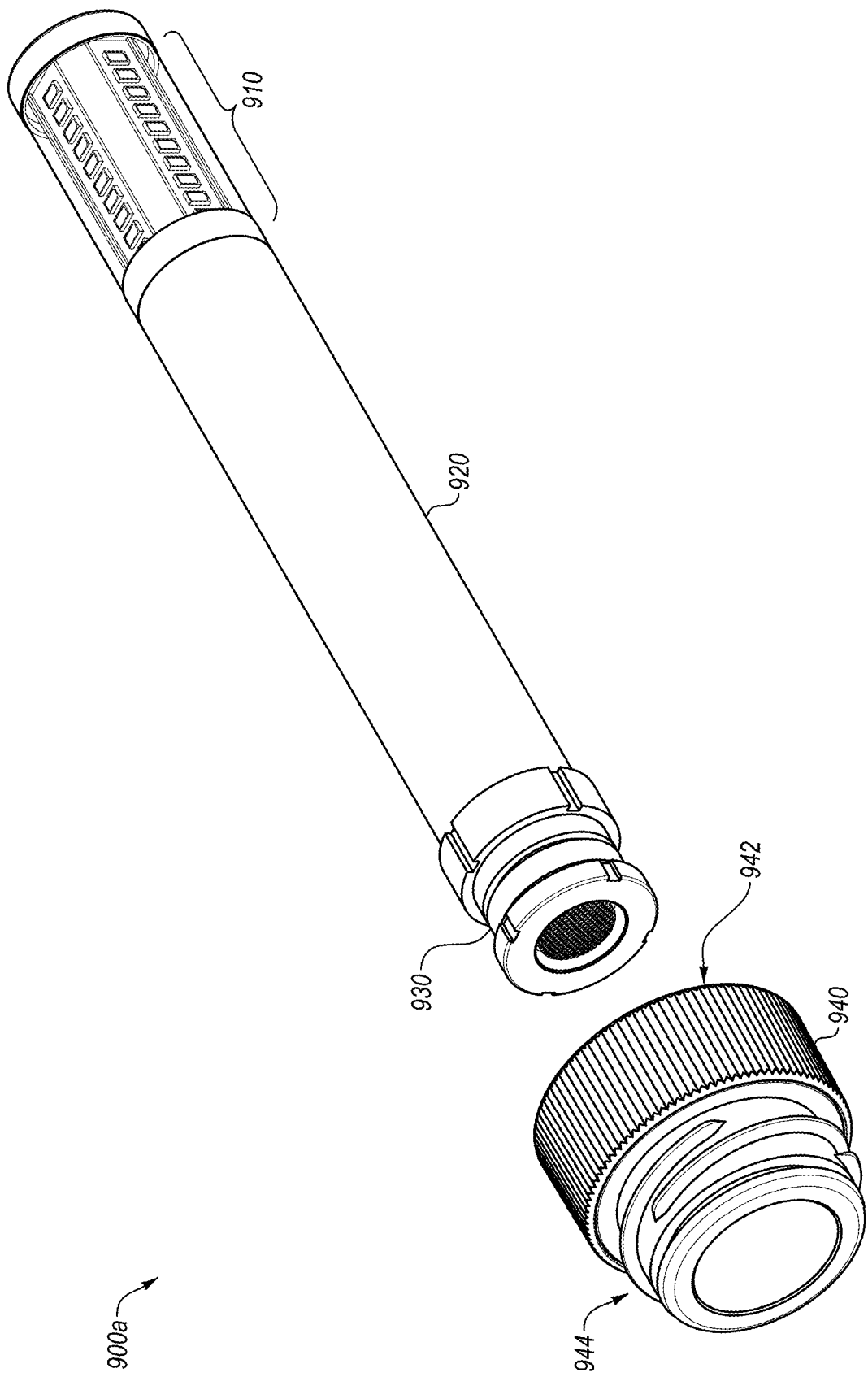
FIG. 9A illustrates an additional example lighting device configured to illuminate a traffic cone.

FIG. 9A illustrates an additional example lighting device 900a configured to illuminate a traffic cone, in accordance with one or more embodiments of the present disclosure. In some embodiments, the lighting device 900a may be utilized as a secondary light in conjunction with another lighting device, such as the lighting device 300a of FIGS. 3A and 3B and/or the lighting device 500a of FIGS. 5A and 5B. The lighting device 900a may include a light pod 910, a shaft 920, a shaft coupler 930, and a shaft cap 940.

The light pod 910 may include one or more arrays of lights configured to emit light in multiple directions, and in some embodiments, in a full three hundred and sixty degrees. In this way, when the lighting device 900a is disposed within a cone, the entire cone may be illuminated by the lighting device 900a. The light pod 910 may be made of any type of light source, such as LEDs, OLEDs, incandescent, fluorescent, etc.

The shaft 920 may be configured to place the light pod 910 further down inside a cone rather than being disposed near the top of the cone such that the light pod 910 provides a robust distribution of light within the cone. In some embodiments, the shaft 920 may house one or more batteries to power the lighting device 900a.

The shaft coupler 930 may be configured to couple the shaft to the shaft cap 940. For example, the shaft coupler 930 may include a lip or other member that may snap into the shaft cap 940. Additionally or alternatively, the shaft 920 may be made of a unitary body with the shaft cap 940. In these and other embodiments, whether manufactured as separate components or as a single body, the shaft cap 940 and the shaft 920 may be utilized as a single unitary body of the lighting device 900a.

The shaft cap 940 may operate to couple the lighting device 900a to a traffic cone and/or one or more other devices. For example, the shaft cap 940 may include a first threaded portion 942 inside of the shaft cap 940 and a second threaded portion 944 disposed atop the shaft cap 940. The first threaded portion 942 may be shaped and configured to interface with an attachment mechanism such as a male threaded portion atop a cone via a cone attachment member. Independently, but also possibly simultaneously, the second threaded portion 944 may act as an attachment mechanism to couple the lighting device 900a to a primary lighting device, such as the lighting device 300a of FIGS. 3A and 3B. In these and other embodiments, using the dual connectivity of the shaft cap 940, the lighting device 900a may be coupled to a traffic cone and another lighting device at the same time, creating an entire interlocking system to illuminate a cone and provide a light atop the cone.

In some embodiments, the lighting device 900a may include one or more buttons to interact with and/or control operation of the lighting device 900a. In some embodiments, the functionality may include an "on" mode, an "off" mode, and a "flashing" mode. Additionally or alternatively, the functionality may include a "bright," "dim," and "off" mode. In some embodiments, the functionality of the lighting device 900a may be limited as compared to a primary lighting device, such as the lighting device 300a of FIGS. 3A and 3B. In some embodiments, one or more of the buttons of the primary lighting device may control operation of the lighting device 900a. For example, the lighting device 900a may be in wireless communication with the primary lighting device and/or there may be a communicative coupling between the lighting device 900a and the primary lighting device such that the lighting device 900a may mimic operation of the primary lighting device and/or act as a slave to the primary lighting device such that it operates in a manner as instructed by the primary lighting device.

In some embodiments, the light pod 910 may be removable such that the lighting device 900a may operate as an extended battery pack.

Modifications, additions, or omissions may be made to the lighting device 900a without departing from the scope of the present disclosure. For example, the lighting device 900a may include more or fewer elements than those illustrated in FIG. 9A. For example, additional batteries may be coupled to the lighting device 900a after removing the light pod 910. As another example, the light pod 910 may be larger or smaller in size, emit light in more or fewer directions than illustrated, etc. As an additional example, a different attachment mechanism may be utilized by the shaft cap 940.

Figure 9B:
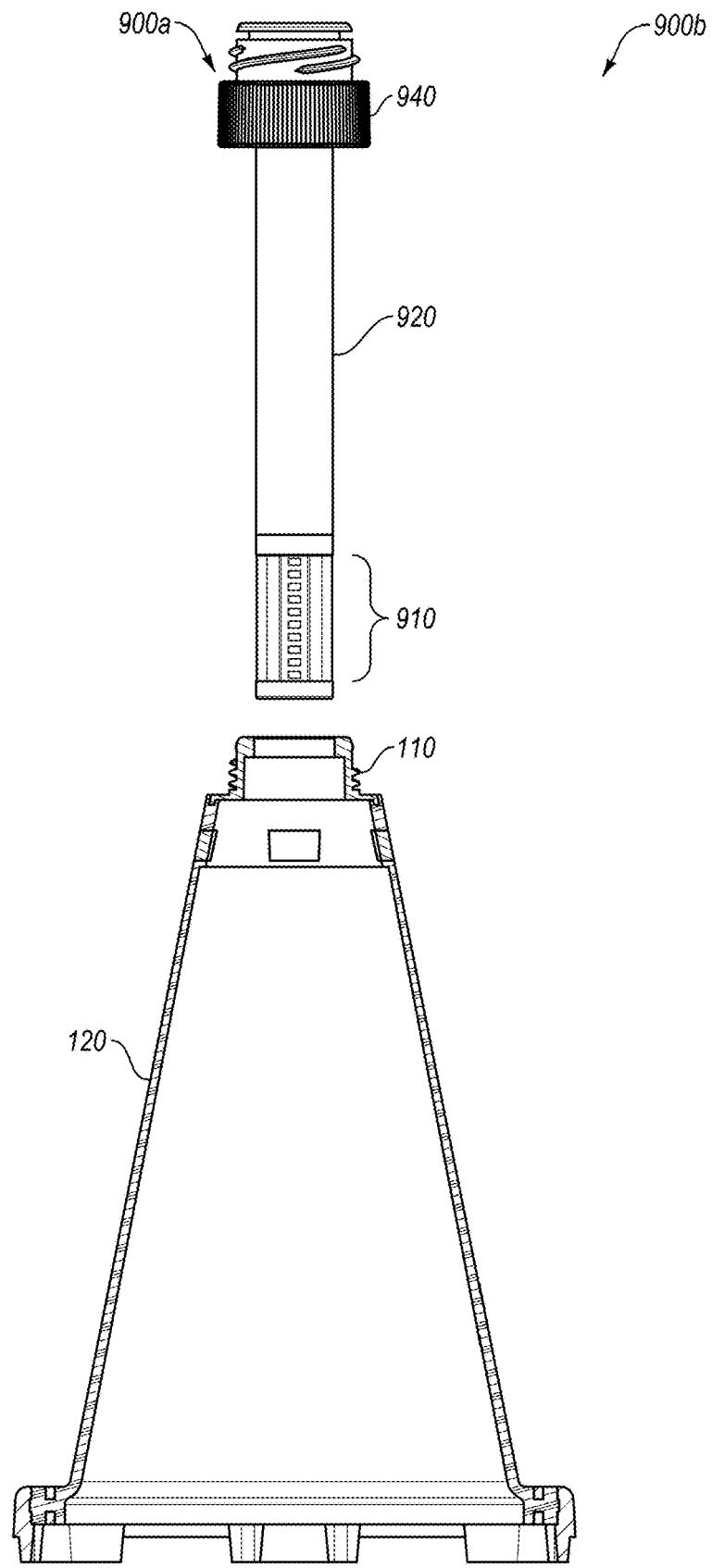
FIGS. 9B-9E illustrate various views of example traffic warning systems with example lighting devices disposed within a traffic cone and configured to illuminate the traffic cone.
Figure 9C:
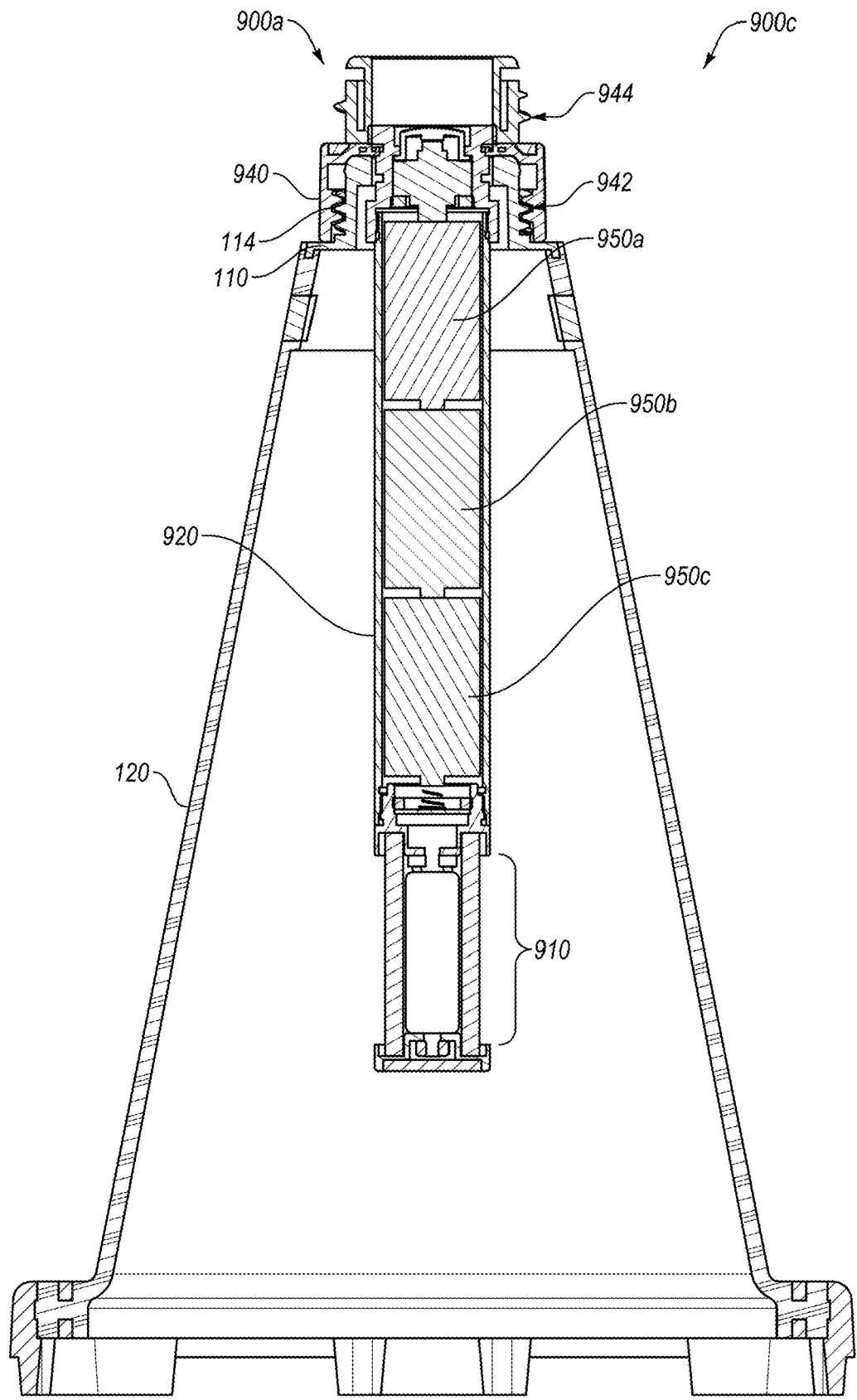
Figure 9D:
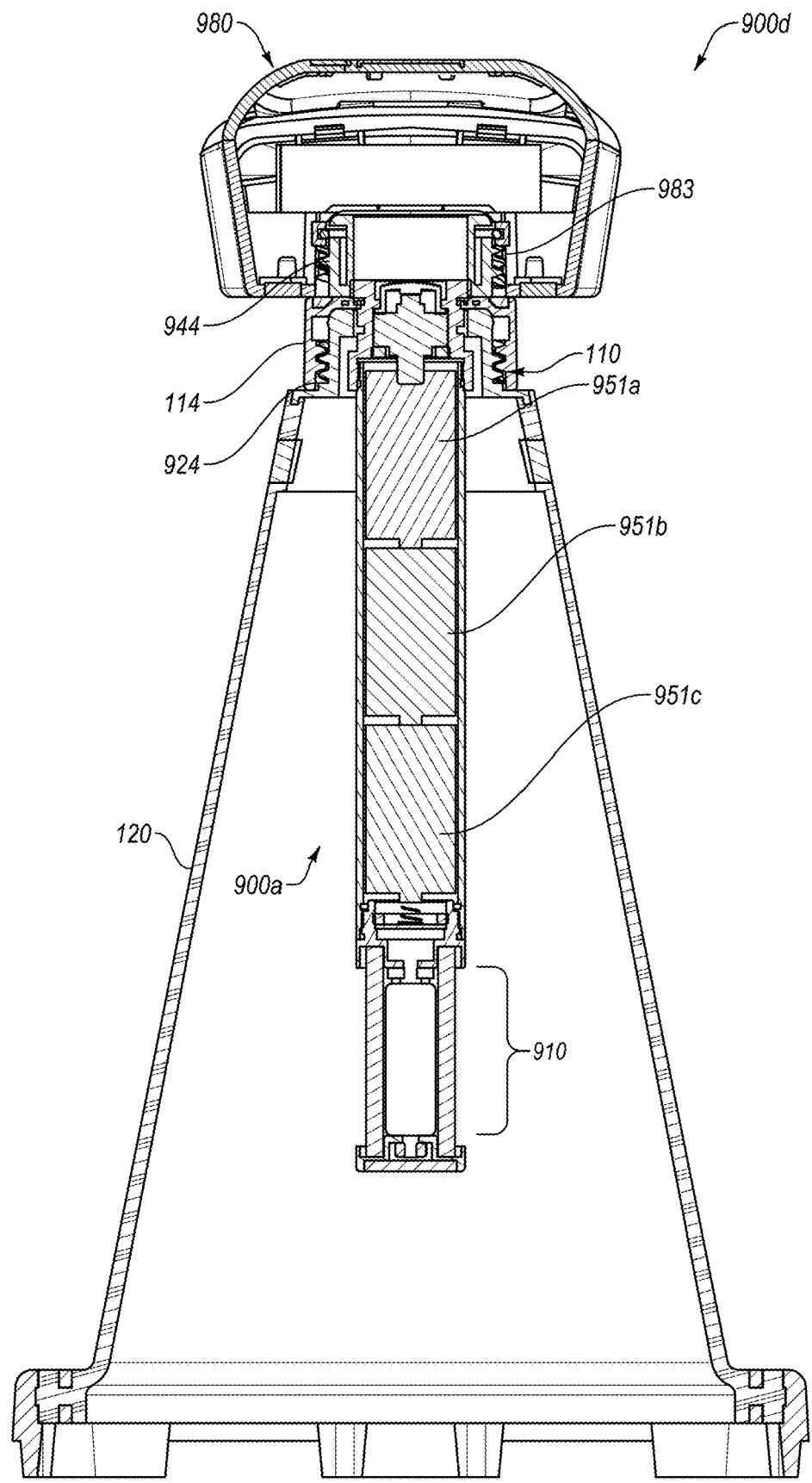
Figure 9E:
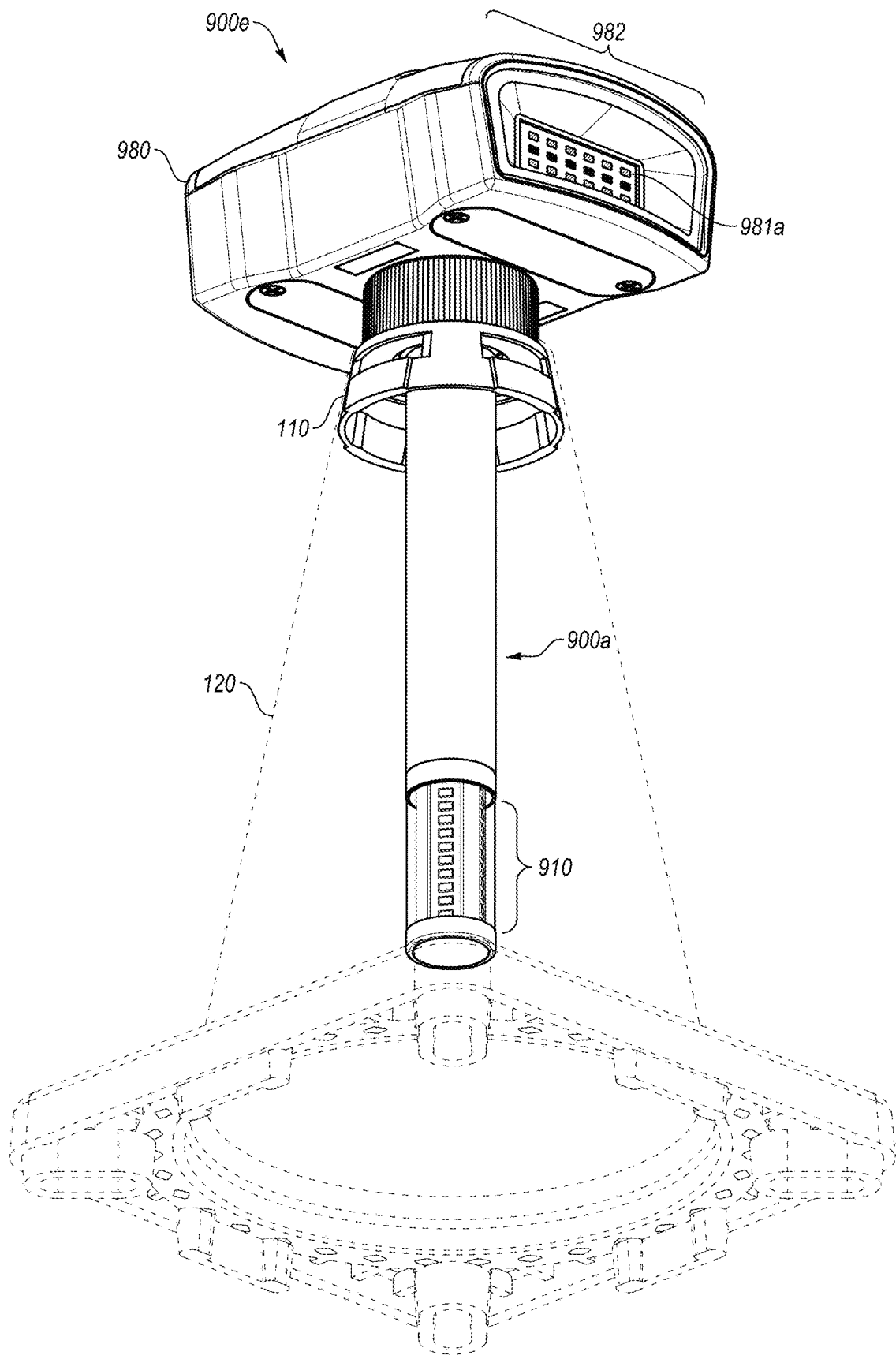

FIGS. 9B-9E illustrate various views of example traffic warning systems 900b-900e, respectively, with example lighting devices disposed within a traffic cone and configured to illuminate the traffic cone, in accordance with one or more embodiments of the present disclosure. FIG. 9B illustrates the lighting device 900a prior to insertion into the cone 120. FIG. 9C illustrates a cutaway view of the lighting device 900a disposed within the cone 120. FIG. 9D illustrates a cutaway view of the lighting device 900a disposed within the cone with a primary lighting device 980 attached atop the lighting device 900a. FIG. 9E illustrates a view of the lighting device 900a coupled to a cone attachment member 110 and coupled to the primary lighting device 980 attached atop the lighting device 900a, with the cone dashed out for visibility purposes.

As illustrated in FIG. 9B, the system 900b includes the lighting device 900a, with the light pod 910, the shaft 920, and the shaft cap 940. The cone 120 may couple to the lighting device 900a via the cone attachment member 110.

As illustrated in FIG. 9C, the system 900c includes the lighting device 900a. The threaded portion 114 of the cone attachment member 110 may interface with the threaded portion 942 of the shaft cap 940. In some embodiments, such an interface may include lips at the end of the threaded portions for locking the two components together.

The shaft 920 may include batteries 950, such as the batteries 950a, 950b, and 950c. In these and other embodiments, the batteries 950 may power the light pod 910. Additionally or alternatively, the lighting device 900a may include an electronic coupling device passing through the shaft cap 940 such that a device coupled to the second threaded portion 944 may utilize the battery power from the shaft 920. In such an embodiment, the lighting device 900a may operate as a battery pack or other secondary power source. This may be particularly the case if the light pod 910 is removed. For example, as illustrated in FIG. 9C, the light pod 910 may be removable such that the shaft 920 with the batteries 950 remains coupled to the traffic cone 120 as a secondary power source for other devices coupled to the traffic cone 120.

In some embodiments, the batteries 950 may include a standard size cell, such as a AA, C, or D-cell sized battery or batteries. In some embodiments, the extended battery pack may be configured to extend the run time of a primary lighting device by multiple hours, such as between six and twenty-four hours, or between twelve and eighteen hours. In some embodiments, when operating as an extended battery pack, the lighting device 900a may be encompassed by a durable casing, such as aluminum, steel, shatter-proof nylon, etc. In some embodiments, the material for the casing of the lighting device 900a may be determined to be in compliance with one or more regulations.

As illustrated in FIG. 9D, the lighting device 900a may be coupled atop the cone 120, and the primary lighting device 980 may be coupled to the lighting device 900a. For example, the threaded portion 944 of the lighting device 900a may couple with a threaded portion 983 of the primary lighting device 980. While illustrated with the primary lighting device 980 having a female threaded portion interfacing with a male threaded portion of the shaft cap 940, it will be appreciated that the primary lighting device 980 could readily have a male threaded portion, or any other attachment mechanism configured to interface with the top portion of the lighting device 900a. For example, the top of the lighting device 900a may include a magnet or metal disk via which the primary lighting device 980 may couple to the lighting device 900a. Additionally or alternatively, as noted above, the attachment mechanism between the lighting device 900a and the cone attachment member 110, as well as the attachment mechanism between the lighting device 900a and the primary lighting device 980 may include a locking feature such as interfacing lips or any other mechanism to utilize a locking mechanism to prevent the components from becoming separated.

In some embodiments, the primary lighting device 980 may be electrically coupled to the batteries 950a, 950b, and/or 950c such that the primary lighting device 980 may receive a part or all of its operating power from the lighting device 900a.

FIG. 9E illustrates a perspective view of the lighting device 900a coupled to a cone attachment member 110 and coupled to the primary lighting device 980 attached atop the lighting device 900a, with the cone dashed out for visibility purposes. As illustrated in FIG. 9E, the primary lighting device 980 may utilize a first array of lights 981a within a front cavity 982 to emit light away from the cone 120. At the same time, the light pod 910 may emit light to illuminate the entire cone 120.

Modifications, additions, or omissions may be made to the systems 900b-900e without departing from the scope of the present disclosure. For example, the systems 900b-900e may include more or fewer elements than those illustrated in FIGS. 9B-9E, respectively. For example, the light pod 910 may be removed. As another example, any attachment mechanism may be utilized to couple the various lighting devices (e.g., the lighting device 900a and the primary lighting device 980) together.

Figure 9F:
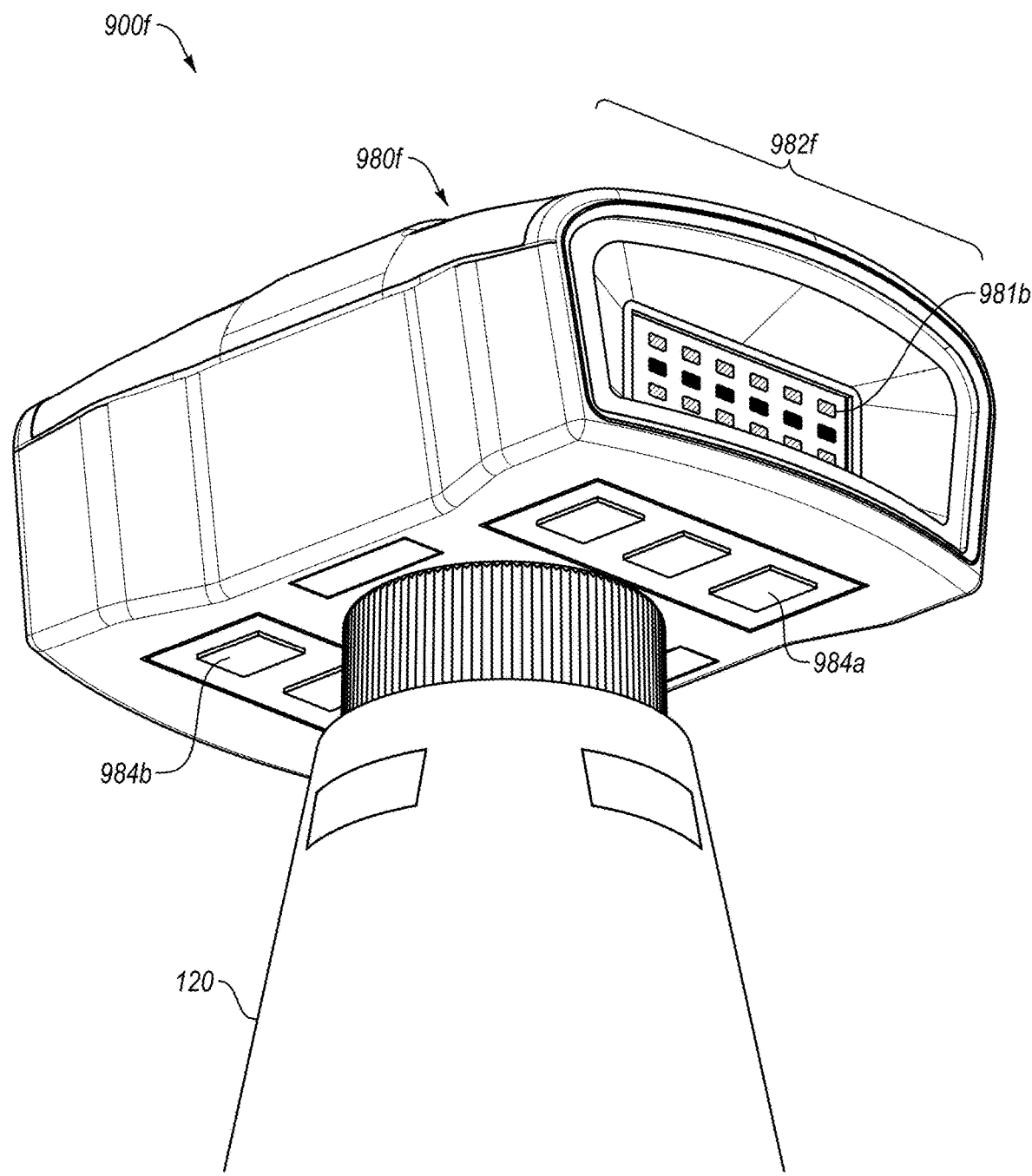
FIG. 9F illustrates another example traffic warning system configured to illuminate a traffic cone.

FIG. 9F illustrates another example traffic warning system 900f configured to illuminate a traffic cone 120, in accordance with one or more embodiments of the present disclosure. The system 900f may include the traffic cone 120 coupled to a primary lighting device 980f. The primary lighting device 980f may be similar or comparable to the primary lighting device 980 with the variations described below. For example, the primary lighting device 980f may include a front cavity 982f with an array of lights 981b to emit light away from the traffic cone 120. The primary lighting device 980*f* may include cone lights 984, such as the cone lights 984*a* and 984*b*.

The cone lights 984 may be positioned and oriented on a bottom face of the primary lighting device 980*f* (such as the lights 491*b* and 492*b* of FIG. 4B). The cone lights 984 may be oriented such that they direct light onto on an outer surface of the cone 120 such that the cone 120 is illuminated by the cone lights 984. The present disclosure thus contemplates illuminating a cone from within (such as illustrated, for example, in FIGS. 4C and 9A-9E) as well as from without (such as illustrated, for example, in FIGS. 4B and 9F).

Modifications, additions, or omissions may be made to the system 900*f* without departing from the scope of the present disclosure. For example, the system 900*f* may include more or fewer elements than those illustrated in FIG. 9F. For example, the cone lights 984 may take any shape, form, and include any number of light emitting elements. As another example, the cone lights 984 may illuminate the cone in any color.

FIG. 10 illustrates another example traffic warning system including another example case 1000, in accordance with one or more embodiments of the present disclosure. The case 1000 may be similar or comparable to the case 700 of FIG. 7. For example, the case 1000 may include one or more trays 1010 and 1050, lighting device 1012 (such as the lighting device 1012*a*-1012*d*), and docks 1030*a* and 1030*b* that may be similar or comparable to the tray 710, lighting devices 712, and dock 730 of FIG. 7. Other elements of the case 1000 may not be illustrated, such as a power cord, a battery, charge indicators, etc.

As illustrated in FIG. 10, the tray 1050 may be shaped and configured to hold and/or interface with one or more lighting devices 1052 (such as the lighting devices 1052*a*-1052*f*. The lighting devices 1052 may operate as secondary lights to the lighting devices 1012, and may be similar or comparable to the lighting device 900*a* of FIGS. 9A-9E.

Modifications, additions, or omissions may be made to the case 1000 without departing from the scope of the present disclosure. For example, the case 1000 may include more or fewer elements than those illustrated in FIG. 10. For example, the case 1000 may include multiple trays 1010/1050 and/or any number of lighting devices 1012/1052.

FIG. 11 illustrates another example tray 1100 of another example traffic warning system, in accordance with one or more embodiments of the present disclosure. The tray 1100 may be similar or comparable to the tray 800 of FIG. 8, although shaped and configured to interface with the lighting device 900*a* rather than the lighting device 300*a*. For example, the tray 1100 may include one or more charging ports 1110 (such as the charging ports 1110*a*, 1110*b*, etc.), one or more lighting devices 1150 disposed within the charging ports (such as the lighting devices 1150*a*, 1150*b*, etc.), a handle 1120, and a battery 1130 that may be similar or comparable to the charging ports 810, the lighting devices 850, the handle 820, and the battery 830 of FIG. 8. Additionally, the same teachings and/or modifications applicable to the tray 800 are equally applicable to the tray 1100.

Figure 12:
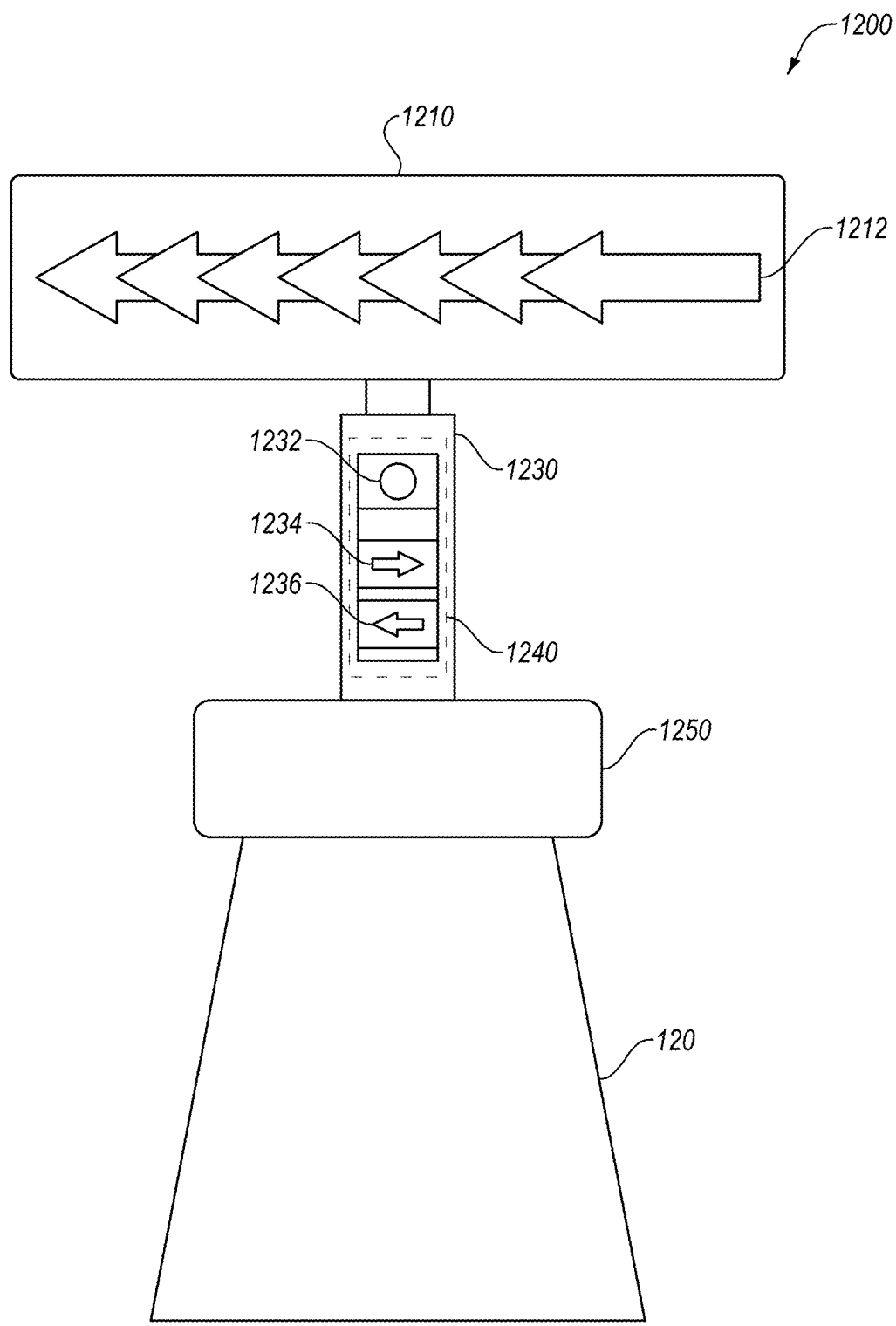
FIG. 12 illustrates another example traffic warning system.

FIG. 12 illustrates another example traffic warning system 1200, in accordance with one or more embodiments of the present disclosure. The system 1200 may include a cone 120 with an attachment mechanism 1250 coupling a lighting device 1210 atop the cone 120.

The lighting device 1210 may include a directional warning system that may include a panel or array of lights (such as LEDs) configured to convey directionality with one or more arrows 1212 or portions thereof. Using such a device, the lighting device 1210 may be deployed on one or more cones 120 to convey the need to change lanes or move over in an emergency or other roadside situation.

In some embodiments, the panel or array of lights and/or a board to which they are attached may be configured to be rotated. For example, the panel or array of lights and/or the board may be rotated from a horizontal position (as illustrated in FIG. 12) to a vertical position for storage. As another example, the panel or array of lights and/or a board to which they are attached may be rotated and may still be operable to convey information via the arrows 1212 to traffic to move forward. In some embodiments, the panel or array of lights may be configured such that the panel of lights may convey alternative directions without physically moving the lights, e.g., by selecting a different program of illuminating the panel or array of lights such that a different direction of arrow 1212 is depicted. For example, the arrows 1212 are illustrated as pointing to the left, corresponding to a button or control 1236. By invoking a button or control 1234, the display may change the direction of the arrows 1212 to point to the right. Additionally or alternatively, the panel or array of lights and/or the board may be rotated one hundred and eighty degrees such that the arrows 1212 point in the opposite direction (e.g., right instead of left).

In some embodiments, a shaft 1230 coupling the panel or array of lights and/or the board to the attachment mechanism 1250 to couple the lighting device 1210 to the traffic cone 120 may include one or more buttons (such as buttons 1232, 1234 and 1236) to control operation of the lighting device 1210. For example, the buttons may include a first button 1232 that may operate in a similar manner to the other buttons described herein (e.g., turning on, turning off, adjusting programming, etc.). Additionally or alternatively, additional buttons (such as the buttons 1234 and 1236) may be included to alter the direction of arrows emitting light.

In some embodiments, the shaft 1230 may include one or more batteries 1240 or other power sources such that the lighting device 1210 may operate without being plugged in or using another power source. In some embodiments, the lighting device 1210 may be configured to couple with a charging device or charging ports in a similar or comparable manner to the lighting device 850 coupling to the charge ports 810 in FIG. 8. Additionally or alternatively, the lighting device 1210 may be stored in a case in a similar manner to the lighting devices 1012 and/or 1052 in the case 1000 of FIG. 10.

In some embodiments, the attachment mechanism 1250 may be similar or comparable to that used in other embodiments of the present disclosure, such as a magnet affixed to the bottom of the shaft 1230 to couple with a metal disk atop the cone 120 (e.g., via a cone attachment member). Using the magnet, the lighting device 1210 may be attached to metal surfaces in addition to being able to couple with the cone 120. As another example of the attachment mechanism 1250, the lighting device 1210 may include a male or female threaded portion to facilitate coupling with the cone 120.

Modifications, additions, or omissions may be made to the system 1200 without departing from the scope of the present disclosure. For example, the system 1200 may include more or fewer elements than those illustrated in FIG. 12. For example, any manner of attachment mechanism 1250 may be used to couple the lighting device 1210 to the cone 120. As another example, the arrows 1212 and the associated display may be oriented in any direction. As an additional example, any number of other buttons may be used in conjunction with the lighting device 1210.

FIG. 13A illustrates a device 1300a for coupling with a traffic cone in a traffic warning system, in accordance with one or more embodiments of the present disclosure.

The device 1300a may include a traffic cone portion 1310 and a light portion 1320 and a connecting member 1330 between. Additionally, the device 1300a may include an attachment device 1340 atop the light portion 1320. The traffic cone portion 1310 may be shaped and configured to go inside of a traffic cone such that the connecting member 1330 projects up and out through a top hole in the cone while the edges of the cone portion 1310 remain below the lip around the top hole of the cone.

The light portion 1320 may be threaded or otherwise coupled to the connecting member 1330 in a manner such that the light portion 1320 and the cone portion 1310 pinch the lip around the top hole of the cone. In some embodiments, the connecting member 1330 may lock the light portion 1320 and the cone portion 1310 together, such as via a one-way ratcheting mechanism, a threaded connection, etc.

The attachment device 1340 may include any attachment mechanism consistent with the present disclosure, including a metal disk, a male or female threaded portion, etc.

FIG. 13B illustrates a top-down view of an example traffic warning system 1300b utilizing the device 1300a of FIG. 13A, in accordance with one or more embodiments of the present disclosure. For example, as illustrated in FIG. 13B, the cone 1305 may have the light portion 1320 atop the cone with the attachment device 1340 available atop the cone 1305 for coupling a device, such as a lighting device to the cone 1305.

Modifications, additions, or omissions may be made to the system 1300b without departing from the scope of the present disclosure. For example, the system 1300b may include more or fewer elements than those illustrated in FIG. 13B. For example, the attachment device 1340 may utilize any attachment mechanism. Furthermore, FIGS. 13A and 13B serve to illustrate that any approach to connecting an attachment mechanism to a cone such that the lighting devices of the present disclosure may be coupled to such a cone are contemplated as within the scope of the present disclosure.

Figure 14:
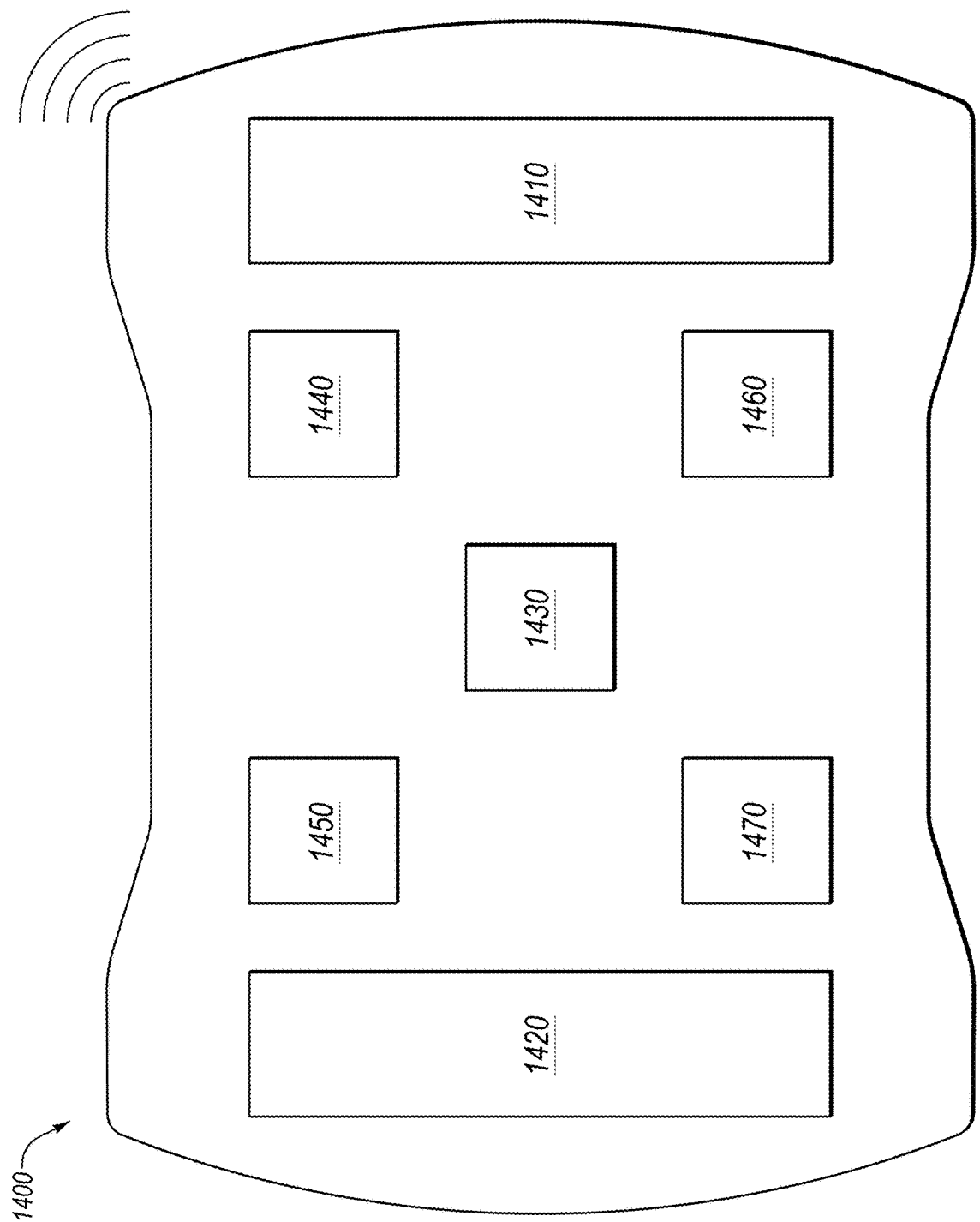
FIG. 14 illustrates a schematic view of another example lighting device.

FIG. 14 illustrates a schematic view of another example lighting device 1400, in accordance with one or more embodiments of the present disclosure. The lighting device 1400 may include a first array of lights 1410 (e.g., at a front of the lighting device 1400), a second array of lights 1420 (e.g., at a back of the device 1400), a processing device 1430, a communication device 1440, a power source 1450, a storage device 1460, and a user interface device 1470. The various components of the lighting device 1400 may be in communication with each other.

The first and/or second array of lights 1410/1420 may include an array of lights that is similar or operable to the array of lights illustrated in FIG. 6. For example, the arrays of lights 1410/1420 may receive instructions from the processing device 1430 regarding when to emit light, and when to stop emitting light. For example, the processing device 1430 may recall a program from the storage device 1460 (e.g., memory) of a flashing pattern to be used by the arrays of lights 1410/1420. The processing device 1430 may send signals to the arrays of lights 1410/1420 to emit light consistent with the program recalled from the storage device 1460.

The processing device 1430 may include any suitable special-purpose or general-purpose computer, computing entity, or processing device, and may be configured to execute instructions stored on any applicable computer-readable storage media. For example, the processing device 1430 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. The processing device 1430 may additionally or alternatively be configured to control or direct operation of other devices of the lighting device 1400.

The communication device 1440 may include any device or component that facilitates communication with a remote device, such as another lighting device 1400 or a remote control device. For example, the communication device 1440 may include an RF antenna, an IR receiver, a Wi-Fi chip, a Bluetooth chip, a cellular chip, or any other communication device.

The power source 1450 may include any device or component configured to provide power to the lighting device 1400 and/or the components thereof. For example, the power source 1450 may include a rechargeable battery, a disposable battery, a connection to an AC or DC power source, or any other power source.

The storage device 1460 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processing device 1430. By way of example such computer-readable storage media may include non-transitory computer-readable storage media including Random Access Memory (RAM), Read-Only Memory (ROM), Electrically Erasable Programmable Read-Only Memory (EEPROM), flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processing device 1430 to perform a certain operation or group of operations.

The user interface device 1470 may include any device or component allowing a user to interact with the lighting device 1400. For example, the user interface device 1470 may include one or more manual or electronic buttons. As another example, the user interface device 1470 may include a touch screen or other electronic input device.

Modifications, additions, or omissions may be made to the lighting device 1400 without departing from the scope of the present disclosure. For example, the lighting device 1400 may include more or less components than those illustrated in FIG. 14.

Figure 15:
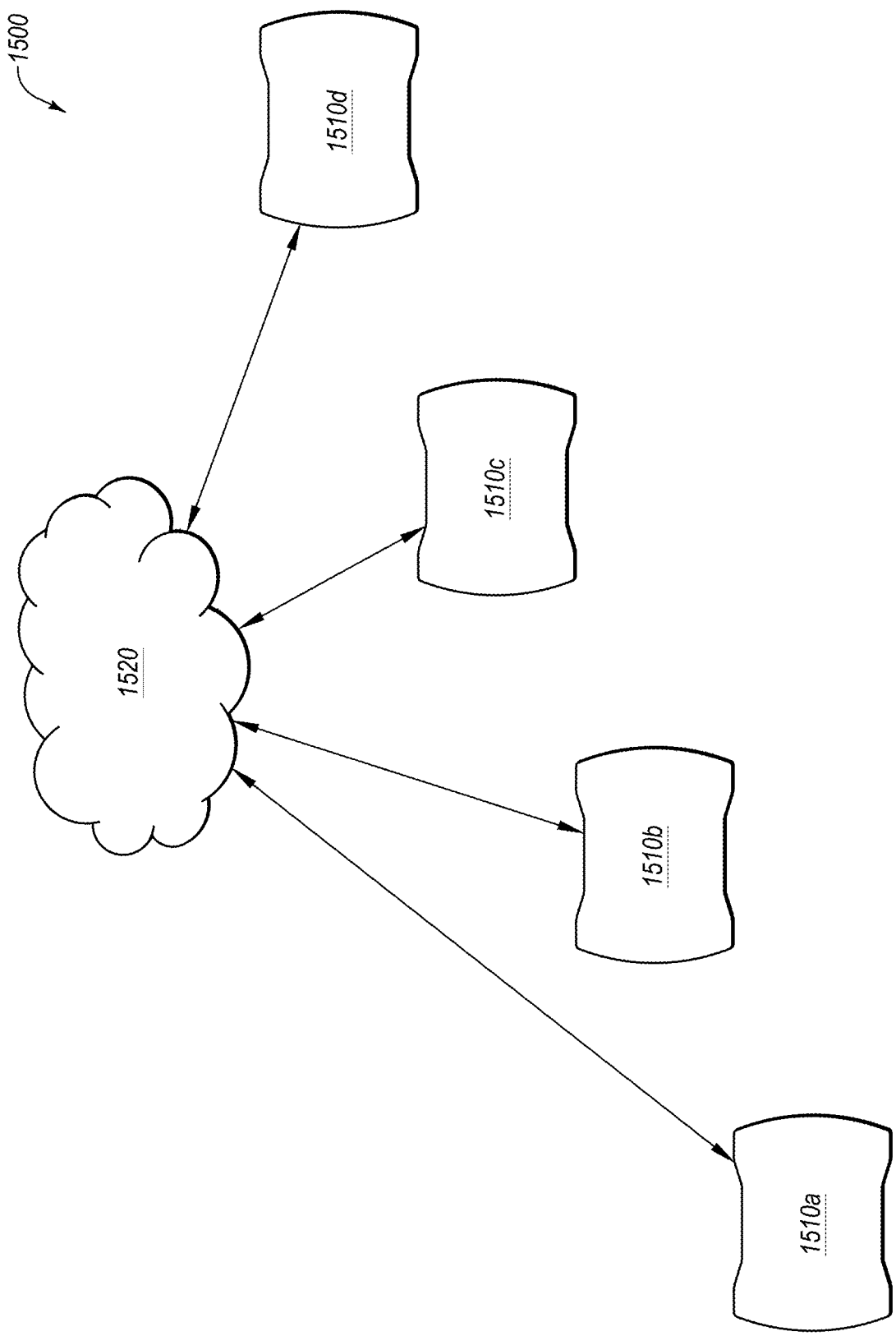
FIG. 15 illustrates a schematic view of another example traffic warning system utilizing multiple lighting devices.

FIG. 15 illustrates a schematic view of another example traffic warning system 1500 utilizing multiple lighting devices 1510 (such as the lighting devices 1510a-1510d), in accordance with one or more embodiments of the present disclosure. The lighting devices 1510 may be configured to operate cooperatively. As illustrated in FIG. 15, the communication between the lighting devices 1510 occurs over a network 1520.

For example, the lighting devices 1510 may be configured to generate a pattern or flow, not just on the individual lights of a given lighting device 1510, but between the lighting devices 1510. For example, multiple lighting devices 1510 may be configured to light up in ascending or descending order. As another example, the multiple lighting devices 1510 may flash in alternating colors (such as red, blue, red, blue, red, blue). Additionally or alternatively, any other pattern or combination is contemplated within the present disclosure.

In some embodiments, the lighting devices 1510 may include a startup sequence to determine a master and/or slave characteristic of the lighting devices. For example, upon start up, the lighting devices 1510 may determine if another lighting device is in close enough proximity for communication (e.g., via Bluetooth or NFC). If no devices are detected, the lighting device 1510 may take a role of master. As another example, if part of a set of lighting devices (such as those in a case together), the starting up lighting device may search for any of a set of known lighting devices. If other devices are detected, the lighting device 1510 may take a role of slave and may operate as instructed from the lighting device 1510 designated as master. For example, if the lighting device 1510a is powered up first, the lighting device 1510a may be a master device. If the lighting device 1510b is powered up second, it may take a role as a slave to the lighting device 1510a.

In some embodiments, a slave device may relay or convey instructions to other slave lighting devices. For example, the master lighting device 1510a may send instructions to a closest slave lighting device 1510b, which may relay the instructions to the next closest slave lighting device 1510c, which may relay the instructions to the next closest slave lighting device 1510d. In such an embodiment, the delay in relaying the instructions may create a cascade effect from the master lighting device 1510a along to the last slave lighting device 1510d.

In some embodiments, the master lighting device 1510a may transmit a timing signal to the other lighting devices 1510b-d such that when the slave lighting devices 1510b-d receive instructions they may also receive the timing signal and/or offset timing instructions of when to take certain actions, such as emit certain colors of lights or cease emitting light.

It will be appreciated that any pattern of order, color, etc. for the series of lighting devices is contemplated within the present disclosure.

The network 1520 may include any system, device, protocol, etc. consistent with one or more communication modalities consistent with the present disclosure. The network 1520 may include direction device-to-device communication between the lighting device 1510. Additionally or alternatively, the network 1520 may include intermediate devices that may be configured to relay or otherwise convey messages from one lighting device 1510 to another lighting device 1510.

Modifications, additions, or omissions may be made to the system 1500 without departing from the scope of the present disclosure. For example, the system 1500 may include more or less components than those illustrated in FIG. 15.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A lighting system comprising:
    a lighting device comprising:
        a body;
        at least one light that emits light away from the body; and
        a coupling device on a bottom face of the body, the coupling device to interface directly with an attachment mechanism atop a traffic cone; and
    an internal light shaped to interface with the attachment mechanism atop the traffic cone and be supported within the traffic cone by being suspended from the attachment mechanism within the traffic cone at the same time the lighting device is positioned atop the traffic cone.

2. The lighting system of claim 1, wherein the at least one light includes a first light associated with a front face of the body and a second light associated with a back face of the body.

3. The lighting system of claim 2, the lighting device further comprising:
    a processing device within the body and configured to control operation of the first and the second lights such that they are independently operable; and
    a window in the body via which a remote transmitter communicates with the processing device to modify operation of the first and second lights.

4. The lighting system of claim 1, wherein the coupling device on the bottom face of the body of the lighting device includes a magnet.

5. The lighting system of claim 1, wherein the attachment mechanism atop the traffic cone includes a hole in at least a top face of the attachment mechanism.

6. The lighting system of claim 1, wherein the attachment mechanism atop the traffic cone pinches a lip around a top hole of the traffic cone.

7. The lighting system of claim 1, wherein the attachment mechanism atop the traffic cone includes a one-way ratcheting mechanism to lock a light portion and a cone portion of the attachment mechanism, the light portion shaped to directly interface with the coupling device on the bottom face of the body of the lighting device and the cone portion shaped to be disposed within the traffic cone.

8. The lighting system of claim 1, wherein the lighting device includes at least one button in the body for controlling operation of the lighting device.

9. The lighting system of claim 8, wherein the at least one button comprises a first button for controlling operation of a first light and a second button for controlling a second light.

10. The lighting system of claim 1, further comprising a battery to provide power to the at least one light.

11. The lighting system of claim 10, wherein the battery is a rechargeable battery.

12. The lighting system of claim 11, further comprising charging electrodes for recharging the rechargeable battery disposed within the coupling device.

13. The lighting system of claim 10, wherein the battery is disposed within the lighting device.

14. The lighting system of claim 10, further comprising a second battery powering the internal light separate from the battery powering the at least one light.

15. The lighting system of claim 1, wherein the at least one or more light is disposed on the bottom face of the body.

* * * * *